United States Patent
Ishizuka

(10) Patent No.: US 11,031,898 B2
(45) Date of Patent: Jun. 8, 2021

(54) POWER CONVERTER CONTROL DEVICE

(71) Applicant: Mitsubishi Electric Corporation, Chiyoda-ku (JP)

(72) Inventor: Mitsuru Ishizuka, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/753,944

(22) PCT Filed: Nov. 30, 2017

(86) PCT No.: PCT/JP2017/042957
§ 371 (c)(1),
(2) Date: Apr. 6, 2020

(87) PCT Pub. No.: WO2019/106777
PCT Pub. Date: Jun. 6, 2019

(65) Prior Publication Data
US 2020/0287494 A1    Sep. 10, 2020

(51) Int. Cl.
*H02P 6/14* (2016.01)
*H02P 27/08* (2006.01)
(Continued)

(52) U.S. Cl.
CPC .......... *H02P 27/08* (2013.01); *H02M 7/5395* (2013.01); *H02P 25/22* (2013.01)

(58) Field of Classification Search
CPC ........ H02P 27/08; H02P 25/22; H02M 7/5395
(Continued)

(56) References Cited

U.S. PATENT DOCUMENTS

| 9,024,563 B2* | 5/2015 | Bunte | H02P 25/184 |
| | | | 318/503 |
| 2011/0080131 A1* | 4/2011 | Shimada | H02P 27/04 |
| | | | 318/503 |
| 2020/0389115 A1* | 12/2020 | Saha | H02M 7/48 |

FOREIGN PATENT DOCUMENTS

| JP | 2007-252138 A | 9/2007 |
| JP | 2007-295647 A | 11/2007 |

(Continued)

OTHER PUBLICATIONS

International Search Report dated Dec. 26, 2017 in PCT/JP2017/042957 filed on Nov. 30, 2017, 2 pages.

*Primary Examiner* — Erick D Glass
(74) *Attorney, Agent, or Firm* — Xsensus LLP

(57) ABSTRACT

A power converter control device performs PWM control for power converters which respectively supply power to a plurality of winding groups of a multiplex-winding electric motor including the plurality of winding groups, the power converter control device including a PWM control unit which performs control while selectively switching among an asynchronous PWM control mode using a carrier not synchronized with voltage commands for respective winding groups and both or one of a first synchronous PWM control mode in which voltage commands for respective winding groups are subjected to PWM control using a carrier synchronized with a voltage command for a specific winding group, and a second synchronous PWM control mode in which voltage commands for respective winding groups are subjected to PWM control using respective carriers synchronized with the respective voltage commands.

18 Claims, 24 Drawing Sheets

(51) Int. Cl.
*H02M 7/5395* (2006.01)
*H02P 25/22* (2006.01)

(58) Field of Classification Search
USPC .................................................. 318/400.26
See application file for complete search history.

(56) References Cited

FOREIGN PATENT DOCUMENTS

| | | |
|---|---|---|
| JP | 2008-43046 A | 2/2008 |
| JP | 6165216 B2 | 7/2017 |

\* cited by examiner

FIG. 12

| OPERATION STATE | | LOW SPEED | MIDDLE SPEED | | HIGH SPEED |
|---|---|---|---|---|---|
| FIRST GROUP | | ASYNCHRONOUS PWM | 9-PULSE SYNCHRONOUS PWM | 6-PULSE SYNCHRONOUS PWM | 3-PULSE SYNCHRONOUS PWM |
| SECOND GROUP | | | | | 3-PULSE SYNCHRONOUS PWM |
| CARRIER | | COMMON | COMMON (FIRST GROUP) | COMMON (FIRST GROUP) | INDIVIDUAL GROUP (INDEPENDENT) |
| CURRENT CONTROL | | YES | YES | YES/NO | YES/NO |

FIG. 18

| OPERATION STATE | LOW SPEED | MIDDLE SPEED | | HIGH SPEED |
|---|---|---|---|---|
| FIRST GROUP | ASYNCHRONOUS PWM | 9-PULSE SYNCHRONOUS PWM | 6-PULSE SYNCHRONOUS PWM | 3-PULSE SYNCHRONOUS PWM |
| SECOND GROUP | | | | 3-PULSE SYNCHRONOUS PWM |
| CARRIER | COMMON | INDIVIDUAL GROUP (FIRST GROUP) | INDIVIDUAL GROUP (FIRST GROUP) | INDIVIDUAL GROUP (COMMON) |
| CURRENT CONTROL | YES | YES | YES/NO | YES/NO |

POWER CONVERTER CONTROL DEVICE

TECHNICAL FIELD

The present invention relates to a power converter control device that controls a power converter for performing power conversion between DC power and AC power using a plurality of semiconductor switching elements, and in particular, relates to a power converter control device that controls a power converter for supplying AC power to a plurality of winding groups so as to drive a multiplex-winding electric motor having an armature winding multiplexed by the plurality of winding groups.

BACKGROUND ART

A power converter is connected between an AC power system and a DC power system and is used for converting power between DC and AC. In the case of driving an electric motor using such a power converter, pulse width modulation (hereinafter, PWM) control is widely used as a control method therefor. In PWM control, a voltage command for driving the electric motor is subjected to triangle wave comparison processing using a carrier signal, thereby generating a switching pulse for driving a switching element of the power converter. If the rotation speed of the electric motor becomes high speed while the carrier frequency is constant, the number of times of switching per one cycle of the voltage command decreases. Therefore, in order to drive the electric motor at high speed, synchronous PWM control may be performed in which the phase of the voltage command and the phase of the carrier signal are synchronized and the frequency of the carrier signal is set to an integer multiple of the frequency of the voltage command (which is often an odd multiple such as three times or nine times). Applying the synchronous PWM control enables the electric motor to be driven with a less number of pulses, leading to reduction in switching loss of the power converter.

In the case of updating the voltage command in the synchronous PWM control, calculation therefor needs to be performed between a top and a top, a bottom and a bottom, or a top and a bottom of the carrier signal. Then, when the voltage command is changed, the phase of the carrier signal is also changed, so that the time for calculating the voltage command varies.

In the case of a multiplex-winding electric motor, a plurality of power converters for supplying AC power to each winding group, and a voltage command and a carrier signal corresponding to each winding group, are needed, and in addition, change in current flowing through one winding group can influence current flowing through another winding group. Therefore, there is a case where each voltage command is calculated using currents of the plurality of winding groups, but when synchronous PWM control is performed using two carrier signals, timing of calculating each voltage command becomes complicated.

Regarding PWM control for a plurality of winding groups as described above, the following electric motor control device is proposed: in the case of driving two three-phase AC electric motors, the cycle of two carrier signals having equal cycles and for generating two sets of PWM waveforms is set as a count value of a clock number, and a cycle setting value for forming a phase difference is cumulatively added to the count value for the cycle of one carrier signal until reaching a count value corresponding to a predetermined phase difference, whereby the mutual phase relationship is shifted so as to achieve a desired phase difference (see, for example, Patent Document 1).

In addition, the following example is proposed: in a synchronous operation method of an inverter (power converter), a PWM synchronous reference signal calculated by a master inverter is serially transmitted to slave inverters collectively, and the oscillation frequency of a carrier signal is controlled in synchronization with the received PWM synchronous reference signal on the slave inverter side (see, for example, Patent Document 2).

CITATION LIST

Patent Document

Patent Document 1: Japanese Laid-Open Patent Publication No. 2007-252138
Patent Document 2: Japanese Laid-Open Patent Publication No. 2007-295647

SUMMARY OF THE INVENTION

Problems to be Solved by the Invention

However, in the electric motor control device described in Patent Document 1, the cycle and the phase of the carrier signal are controlled using a PWM timer in order to obtain a desired phase difference. Therefore, this is not applicable to synchronous PWM control synchronized with the rotation frequency of the winding groups, and there is a possibility that the electric motor cannot be stably controlled during high-speed rotation.

In the synchronous operation method of an inverter described in Patent Document 2, in such a region in which there are three switching pulses per one cycle of the voltage command when the rotation speed of the electric motor becomes further high speed, the phase of the voltage command and the phase of the fundamental wave contained in switching pulses are deviated from each other by synchronizing the carrier signals between different inverters, and thus, on the contrary, the control might become unstable.

The present invention has been made to solve the above problem, and an object of the present invention is to provide a power converter control device that controls a power converter for supplying power to a multiplex-winding electric motor and enables the multiplex-winding electric motor to be driven stably.

Solution to the Problems

The present invention is directed to a power converter control device for performing PWM control for power converters which respectively supply power to a plurality of winding groups of a multiplex-winding electric motor including the plurality of winding groups, the power converter control device including a PWM control unit configured to perform the PWM control while switching between an asynchronous PWM control mode using a carrier for the PWM control that is not synchronized with three-phase voltage commands for driving the multiplex-winding electric motor, and a synchronous PWM control mode using a carrier for the PWM control that is synchronized with the three-phase voltage commands for driving the multiplex-winding electric motor. The synchronous PWM control mode includes at least one of a first synchronous PWM control mode in which voltage commands for the respective winding groups of the multiplex-winding electric motor are subjected to the PWM control using a carrier synchronized with a voltage command for a specific winding group, and a second synchronous PWM control mode in which voltage commands for the respective winding groups of the multiplex-winding electric motor are subjected to the PWM control using respective carriers synchronized with the respective voltage commands. The PWM control unit performs control while selectively switching between the asynchronous PWM control mode, and both or one of the first synchronous PWM control mode and the second synchronous PWM control mode, on the basis of an operation state of the multiplex-winding electric motor.

Effect of the Invention

The present invention makes it possible to obtain a power converter control device that controls a power converter for supplying power to a multiplex-winding electric motor and enables the multiplex-winding electric motor to be driven stably over a range from a low-speed region to a high-speed region.

BRIEF DESCRIPTION OF THE DRAWINGS

FIG. 12 shows the relationship between the operation state of a multiplex-winding electric motor and the type of a carrier signal used in PWM control, according to embodiment 1 of the present invention.

FIG. 18 shows the relationship between the operation state of a multiplex-winding electric motor and the type of a carrier signal used in PWM control, according to embodiment 3 of the present invention.

DESCRIPTION OF EMBODIMENTS

Embodiment 1

Figure 1:
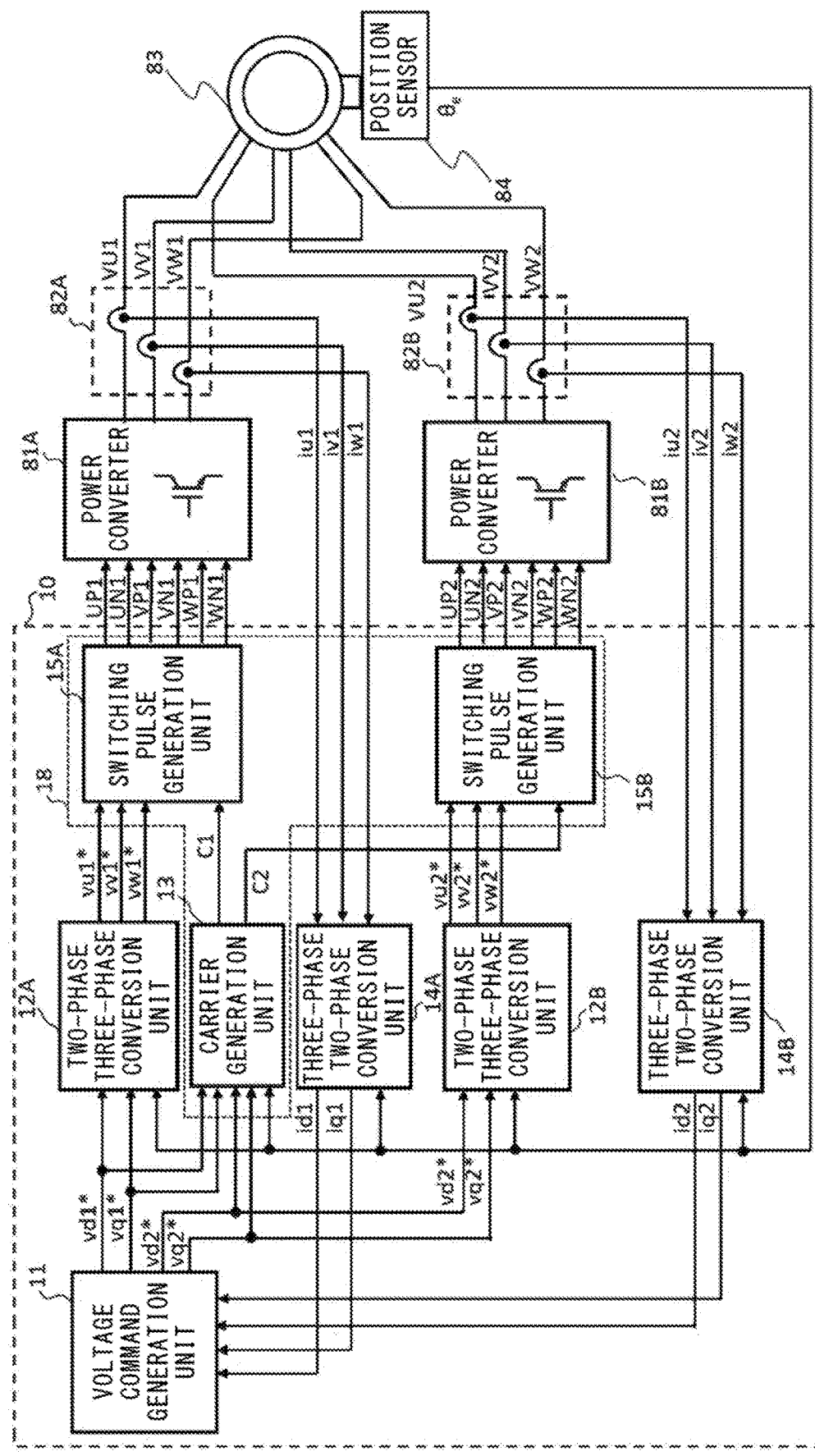
FIG. 1 is a block diagram showing the configuration of a power converter control device according to embodiment 1 of the present invention.

Hereinafter, embodiment 1 of the present invention will be described with reference to FIG. 1 to FIG. 12. FIG. 1 is a block diagram showing the configuration of a power converter control device according to embodiment 1. A power converter control device 10 controls a first power converter 81A and a second power converter 81B for supplying AC power to a multiplex-winding electric motor 83 including two armature winding groups (not shown) composed of a first group and a second group, for example. The multiplex-winding electric motor 83 is, for example, a three-phase AC electric motor, which includes a rotor using a permanent magnet or the like, and is configured such that the winding groups of the first group and the second group each composed of three-phase windings are imparted with a predetermined electric-angle phase difference therebetween. The winding group of the first group, i.e., the first winding group is connected to the first power converter 81A, and the winding group of the second group, i.e., the second winding group is connected to the second power converter 81B, so that the first power converter 81A supplies power to the winding group of the first group, and the second power converter 81B supplies power to the winding group of the second group. The first power converter 81A and the second power converter 81B each include a plurality of switching elements (not shown). These switching elements are turned on/off through PWM control, whereby DC power supplied from a DC power supply (not shown) is converted to three-phase AC power, and first group three-phase AC voltages VU1, VV1, VW1 and second group three-phase AC voltages VU2, VV2, VW2 are applied to the corresponding winding groups, whereby the three-phase AC power is supplied thereto. A first current detector 82A and a second current detector 82B are connected between the multiplex-winding electric motor 83, and the first power converter 81A and the second power converter 81B. The first current detector 82A and the second current detector 82B detect three-phase AC currents flowing between the multiplex-winding electric motor 83, and the first power converter 81A and the second power converter 81B, and output first group three-phase current values iu1, iv1, iw1 and second group three-phase current values iu2, iv2, iw2 as current information. A position sensor 84 is mounted to the multiplex-winding electric motor 83. The position sensor 84 detects the magnetic pole position of the rotor of the multiplex-winding electric motor 83 and outputs a magnetic pole position signal θe. As the first current detector 82A and the second current detector 82B, for example, shunt resistors or current transformers are used, and as the position sensor 84, for example, an incremental encoder or a resolver is used. Instead of the position sensor 84, a rotation sensor may be used to acquire the magnetic pole position from the rotation speed of the rotor.

The power converter control device 10 outputs switching pulses generated on the basis of current commands given from the outside, to the first power converter 81A and the second power converter 81B, thereby controlling the first power converter 81A and the second power converter 81B. Regarding control for an induction electric motor or a synchronous electric motor, it is general to perform control in an orthogonal two-phase coordinate system represented by d and q axes of a rotational coordinate system. Therefore, also in the following description, control using an orthogonal two-phase coordinate system is described.

The power converter control device 10 includes: a voltage command generation unit 11 for generating first group voltage commands vd1*, vq1*, i.e., first voltage commands, which are represented in an orthogonal two-phase coordinate system and for driving the winding group of the first group, and second group voltage commands vd2*, vq2*, i.e., second voltage commands, which are represented in an orthogonal two-phase coordinate system and for driving the winding group of the second group; a carrier generation unit 13 for generating a first carrier signal C1 and a second carrier signal C2 on the basis of the first group voltage commands vd1*, vq1*, the second group voltage commands vd2*, vq2*, and the magnetic pole position signal θe of the rotor of the multiplex-winding electric motor 83; a first two-phase three-phase conversion unit 12A for converting the first group voltage commands vd1*, vq1* to first group three-phase voltage commands vu1*, vv1*, vw1* represented in a three-phase AC coordinate system; and a first switching pulse generation unit 15A which performs triangle wave comparison processing using a first carrier signal C1, for the first group three-phase voltage commands vu1*, vv1*, vw1*, thereby generating first group switching pulses UP1, UN1, VP1, VN1, WP1, WN1, i.e., first switching pulses, for driving the switching elements of the first power converter 81A. Further, the power converter control device 10 includes: a second two-phase three-phase conversion unit 12B for converting the second group voltage commands vd2*, vq2* for the winding group of the second group, to second group three-phase voltage commands vu2*, vv2*, vw2* represented in a three-phase AC coordinate system; and a second switching pulse generation unit 15B which performs triangle wave comparison processing using a second carrier signal C2, for the second group three-phase voltage commands vu2*, vv2*, vw2*, thereby generating second group switching pulses UP2, UN2, VP2, VN2, WP2, WN2, i.e., second switching pulses, for driving the switching elements of the second power converter 81B. The carrier generation unit 13, the first switching pulse generation unit 15A, and the second switching pulse generation unit 15B form a PWM control unit 18. The multiplex-winding electric motor 83 is controlled with a control mode selectively switched by the PWM control unit 18.

The first group switching pulses UP1, UN1, VP1, VN1, WP1, WN1 respectively drive a U-phase positive-side switching element, a U-phase negative-side switching element, a V-phase positive-side switching element, a V-phase negative-side switching element, a W-phase positive-side switching element, and a W-phase negative-side switching element of the first power converter 81A. Similarly, the second group switching pulses UP2, UN2, VP2, VN2, WP2, WN2 respectively drive a U-phase positive-side switching element, a U-phase negative-side switching element, a V-phase positive-side switching element, a V-phase negative-side switching element, a W-phase positive-side switching element, and a W-phase negative-side switching element of the second power converter 81B.

The voltage command generation unit 11 performs predetermined calculation using first group orthogonal two-phase current commands id1*, iq1* and second group orthogonal two-phase current commands id2*, iq2* which are given from the outside, first group orthogonal two-phase current values id1, iq1, and second group orthogonal two-phase current values id2, iq2, thereby generating the first group voltage commands vd1*, vq1* and the second group voltage commands vd2*, vq2*. The first group orthogonal two-phase current values id1, iq1 and the second group orthogonal two-phase current values id2, iq2 are obtained by a first three-phase two-phase conversion unit 14A and a second three-phase two-phase conversion unit 14B respectively converting, into an orthogonal two-phase coordinate system, the first group three-phase current values iu1, iv1, iw1 and the second group three-phase current values iu2, iv2, iw2 respectively acquired by the first current detector 82A and the second current detector 82B.

The magnetic pole position signal θe detected by the position sensor 84 is used as rotor phase information to be used for various calculations by the carrier generation unit 13, the first two-phase three-phase conversion unit 12A, the second two-phase three-phase conversion unit 12B, the first three-phase two-phase conversion unit 14A, and the second three-phase two-phase conversion unit 14B.

Figure 2:
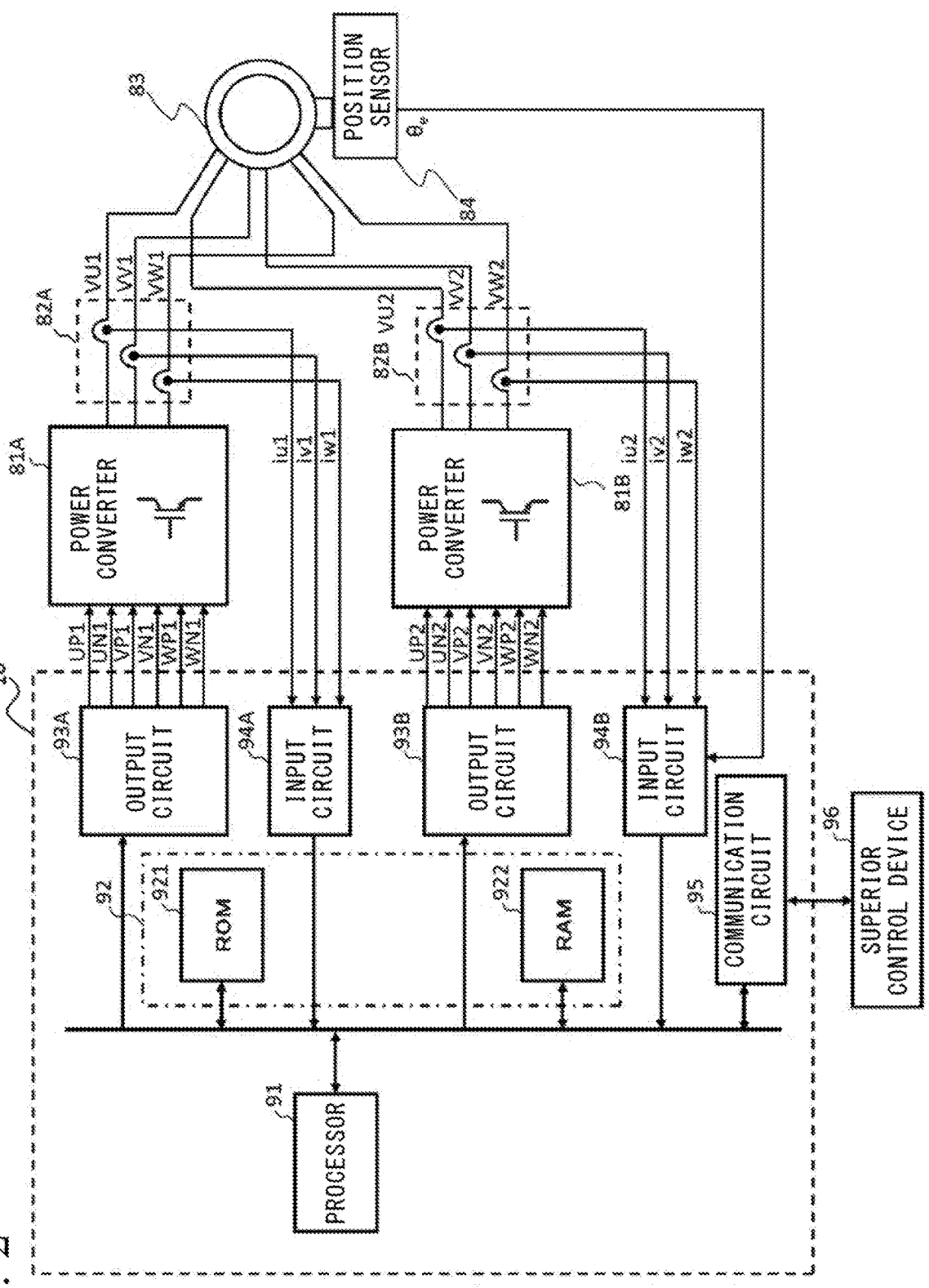
FIG. 2 is a hardware configuration diagram of the power converter control device according to embodiment 1 of the present invention.

FIG. 2 is a block diagram in which the power converter control device according to embodiment 1 is implemented by a processor, and shows components provided for calculation processing. The power converter control device 10 includes: a processor 91 for performing various calculations corresponding to the voltage command generation unit 11, the carrier generation unit 13, the first two-phase three-phase conversion unit 12A, the second two-phase three-phase conversion unit 12B, the first three-phase two-phase conversion unit 14A, the second three-phase two-phase conversion unit 14B, the first switching pulse generation unit 15A, and the second switching pulse generation unit 15B; a storage device 92 including a read only memory (ROM) 921 and a random access memory (RAM) 922, and storing a control program executed by the processor 91 and data needed for various calculations; input circuits 94A, 94B which receive current information from the first current detector 82A and the second current detector 82B, and the magnetic pole position signal ee from the position sensor 84; output circuits 93A, 93B which output switching pulses to the first power converter 81A and the second power converter 81B; and a communication circuit 95 which is connected to a superior control device 96 and performs communication with the superior control device 96 by means of serial communication or the like. The functions of the respective function units described above are achieved through execution of the control program on the above hardware.

Here, calculation of each voltage command will be described in more detail. In calculations of the voltage commands in the power converter control device 10, a current control loop is formed between the power converter control device 10, and the first power converter 81A and the second power converter 81B so that the first group orthogonal two-phase current values id1, iq1 and the second group orthogonal two-phase current values id2, iq2 respectively become the first group orthogonal two-phase current commands id1*, iq1* and the second group orthogonal two-phase current commands id2*, iq2*, thereby controlling the above current values. A matrix for converting current values represented in a three-phase AC coordinate system into an orthogonal two-phase coordinate system is defined as shown by Expression (1). In Expression (1), id and iq are current values on d axis and q axis, respectively, i.e., orthogonal two-phase current values.

[Mathematical 1]

$$id = \sqrt{\frac{2}{3}} \cdot \left[ iu \cdot \cos\theta + iv \cdot \cos\left(\theta - \frac{2}{3}\pi\right) + iw \cdot \cos\left(\theta + \frac{2}{3}\pi\right) \right] \quad (1)$$

$$iq = -\sqrt{\frac{2}{3}} \cdot \left[ iu \cdot \sin\theta + iv \cdot \sin\left(\theta - \frac{2}{3}\pi\right) + iw \cdot \sin\left(\theta + \frac{2}{3}\pi\right) \right]$$

From Expression (1), id and iq are calculated as shown by the following Expression (2).

[Mathematical 2]

$$\begin{bmatrix} id \\ iq \end{bmatrix} = \begin{bmatrix} \cos\theta & \sin\theta \\ -\sin\theta & \cos\theta \end{bmatrix} \cdot \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} iu \\ iv \\ iw \end{bmatrix} \quad (2)$$

In Expression (1) and Expression (2), the phase information θ represents the direction of the magnetic pole position of d axis, where the d axis is defined as the direction of the field magnetic flux of the rotor of the electric motor. It is noted that, if three-phase current values for two phases are used to calculate the three-phase current value for the other phase by using an equation of, for example, iw=−iu−iv, it is possible to perform conversion to orthogonal two-phase current values from two three-phase current values. Here, as the phase information θ to be used for the above coordinate conversion calculation, the magnetic pole position signal θe about the rotor of the multiplex-winding electric motor 83 is used. The calculations of the above Expression (1) and Expression (2) are performed by the first three-phase two-phase conversion unit 14A and the second three-phase two-phase conversion unit 14B. The first three-phase two-phase conversion unit 14A and the second three-phase two-phase conversion unit 14B output the calculation results, i.e., the first group orthogonal two-phase current values id1, iq1 and the second group orthogonal two-phase current values id2, iq2, to the voltage command generation unit 11.

The voltage command generation unit 11 receives the first group orthogonal two-phase current commands id1*, iq1* and the second group orthogonal two-phase current commands id2*, iq2* which are given by a superior control device, the first group orthogonal two-phase current values id1, iq1 calculated by the first three-phase two-phase conversion unit 14A, and the second group orthogonal two-phase current values id2, iq2 calculated by the second three-phase two-phase conversion unit 14B, and calculates the first group voltage commands vd1*, vq1* and the second group voltage commands vd2*, vq2* by proportional-integral (PI) control. In the PI control, calculation of Expression (3) is performed to calculate voltage commands for controlling the winding group of the first group and voltage commands for controlling the winding group of the second group.

[Mathematical 3]

$$vd1^* = \left(Kp + \frac{Ki}{s}\right) \cdot (id1^* - id1) \quad (3)$$

$$vq1^* = \left(Kp + \frac{Ki}{s}\right) \cdot (id1^* - id1)$$

$$vd2^* = \left(Kp + \frac{Ki}{s}\right) \cdot (id2^* - id2)$$

$$vq2^* = \left(Kp + \frac{Ki}{s}\right) \cdot (iq2^* - iq2)$$

In Expression (3), s is a differential operator of Laplace transform, Kp is a proportional gain, and Ki is an integral gain.

For the purpose of inter-group interference prevention processing for suppressing deterioration in control response due to magnetic interference between the two winding groups of the multiplex-winding electric motor 83, the first group voltage commands vd1*, vq1* and the second group voltage commands vd2*, vq2* may be calculated by the following method: the sums and the differences of currents flowing through the winding group of the first group and currents flowing through the winding group of the second group are calculated, thereby calculating voltage commands for both of the first group and the second group at the same time. In this method, first, through PI control shown by Expression (4) and Expression (5), the sums of the voltage commands for both groups are calculated from the sums of the first group current commands id1*, iq1* and the second group current commands id2*, iq2*, and the differences between the voltage commands for both groups are calculated from the differences between the first group current commands id1*, iq1* and the second group current commands id2*, iq2*. In Expression (4), vdsum* is the sum of the voltage commands for both groups in the d-axis direction, and vddiff* is the difference between the voltage commands for both groups in the d-axis direction. In Expression (5), vqsum* is the sum of the voltage commands for both groups in the q-axis direction, and vqdiff* is the difference between the voltage commands for both groups in the q-axis direction.

[Mathematical 4]

$$vdsum^* = \left(Kp + \frac{Ki}{s}\right) \cdot ((id1^* + id2^*) - (id1 + id2)) \quad (4)$$

$$vddiff^* = \left(Kp + \frac{Ki}{s}\right) \cdot ((id1^* - id2^*) - (id1 + id2))$$

[Mathematical 5]

$$vqsum^* = \left(Kp + \frac{Ki}{s}\right) \cdot ((iq1^* + iq2^*) - (iq1 + iq2)) \quad (5)$$

$$vqdiff^* = \left(Kp + \frac{Ki}{s}\right) \cdot ((iq1^* - iq2^*) - (iq1 - iq2))$$

After vdsum*, vddiff*, vqsum*, and vqdiff* are calculated, calculation of Expression (6) is performed to separate the sums vdsum* and vqsum* of the voltage commands and the differences vddiff* and vqdiff* between the voltage commands, into the first group voltage commands vd1*, vq1* and the second group voltage commands vd2*, vq2* which are the voltage commands for the respective winding groups.

[Mathematical 6]

$$vd1^* = \frac{vdsum^* + vddiff^*}{2} \quad (6)$$

$$vd2^* = \frac{vdsum^* - vddiff^*}{2}$$

$$vq1^* = \frac{vqsum^* + vqdiff^*}{2}$$

$$vq2^* = \frac{vqsum^* - vqdiff^*}{2}$$

When PI control by Expression (4) and Expression (5) is performed, four voltage commands vd1*, vq1*, vd2*, vq2* are calculated using four orthogonal two-phase current values id1, iq1, id2, iq2. In this case, the first group voltage commands vd1*, vq1* are influenced by the values of three-phase currents flowing through the winding group of the second group, and the second group voltage commands vd2*, vq2* are influenced by the values of three-phase currents flowing through the winding group of the first group. Therefore, it is necessary to update the voltage commands for the first group and the second group at the same time. It is noted that the inter-group interference prevention processing can also be performed by another calculation method, instead of the calculation method using the sums and differences.

After the first group voltage commands vd1*, vq1* and the second group voltage commands vd2*, vq2* are calculated in the voltage command generation unit 11, the first two-phase three-phase conversion unit 12A and the second two-phase three-phase conversion unit 12B respectively convert the first group voltage commands vd1*, vq1* into the first group three-phase voltage commands vu1*, vv1*, vw1*, and the second group voltage commands vd2*, vq2* into the second group three-phase voltage commands vu2*, vv2*, vw2*. The coordinate conversion for converting the voltage commands in an orthogonal two-phase coordinate system into a three-phase AC voltage command as described above is defined as shown by Expression (7).

[Mathematical 7]

$$vu = \sqrt{\frac{2}{3}} \cdot [vd \cdot \cos\theta - vq \cdot \sin\theta] \quad (7)$$

$$vv = \sqrt{\frac{2}{3}} \cdot \left[vd \cdot \cos\left(\theta - \frac{2}{3}\pi\right) - vq \cdot \sin\left(\theta - \frac{2}{3}\pi\right)\right]$$

$$vw = \sqrt{\frac{2}{3}} \cdot \left[vd \cdot \cos\left(\theta + \frac{2}{3}\pi\right) - vq \cdot \sin\left(\theta + \frac{2}{3}\pi\right)\right]$$

From Expression (7), calculation is performed as shown by Expression (8).

[Mathematical 8]

$$\begin{bmatrix} vu \\ vv \\ vw \end{bmatrix} = \sqrt{\frac{2}{3}} \cdot \begin{bmatrix} 1 & 0 \\ -\frac{1}{2} & \frac{\sqrt{3}}{2} \\ -\frac{1}{2} & -\frac{\sqrt{3}}{2} \end{bmatrix} \cdot \begin{bmatrix} \cos\theta & -\sin\theta \\ \sin\theta & \cos\theta \end{bmatrix} \cdot \begin{bmatrix} vd \\ vq \end{bmatrix} \quad (8)$$

In embodiment 1, the magnetic pole position signal θe is used as the phase information θ in the coordinate conversion by Expression (7) and Expression (8), and a predetermined phase difference is set between the magnetic pole position used in calculation by the first two-phase three-phase conversion unit 12A and the magnetic pole position used in calculation by the second two-phase three-phase conversion unit 12B. The phase difference is based on an electric-angle phase difference between the winding group of the first group and the winding group of the second group.

After performing calculation of Expression (8), the first two-phase three-phase conversion unit 12A and the second two-phase three-phase conversion unit 12B output the first group three-phase voltage commands vu1*, vv1*, vw1* and the second group three-phase voltage commands vu2*, vv2*, vw2* to the first switching pulse generation unit 15A and the second switching pulse generation unit 15B, respectively. In addition, the first carrier signal C1 and the second carrier signal C2 from the carrier generation unit 13 are also inputted to the first switching pulse generation unit 15A and the second switching pulse generation unit 15B, respectively. The first switching pulse generation unit 15A performs triangle wave comparison processing using the first carrier signal C1, for the first group three-phase voltage commands vu1*, vv1*, vw1*, to generate the first group switching pulses UP1, UN1, VP1, VN1, WP1, WN1. The second switching pulse generation unit 15B performs triangle wave comparison processing using the second carrier signal C2, for the second group three-phase voltage commands vu2*, vv2*, vw2*, to generate the second group switching pulses UP2, UN2, VP2, VN2, WP2, WN2. The switching pulses generated by the first switching pulse generation unit 15A and the second switching pulse generation unit 15B are imparted with times for preventing short-circuit of the upper and lower arms of the power converter, and then outputted to the first power converter 81A and the second power converter 81B, to drive the respective switching elements of the first power converter 81A and the second power converter 81B.

Figure 3:
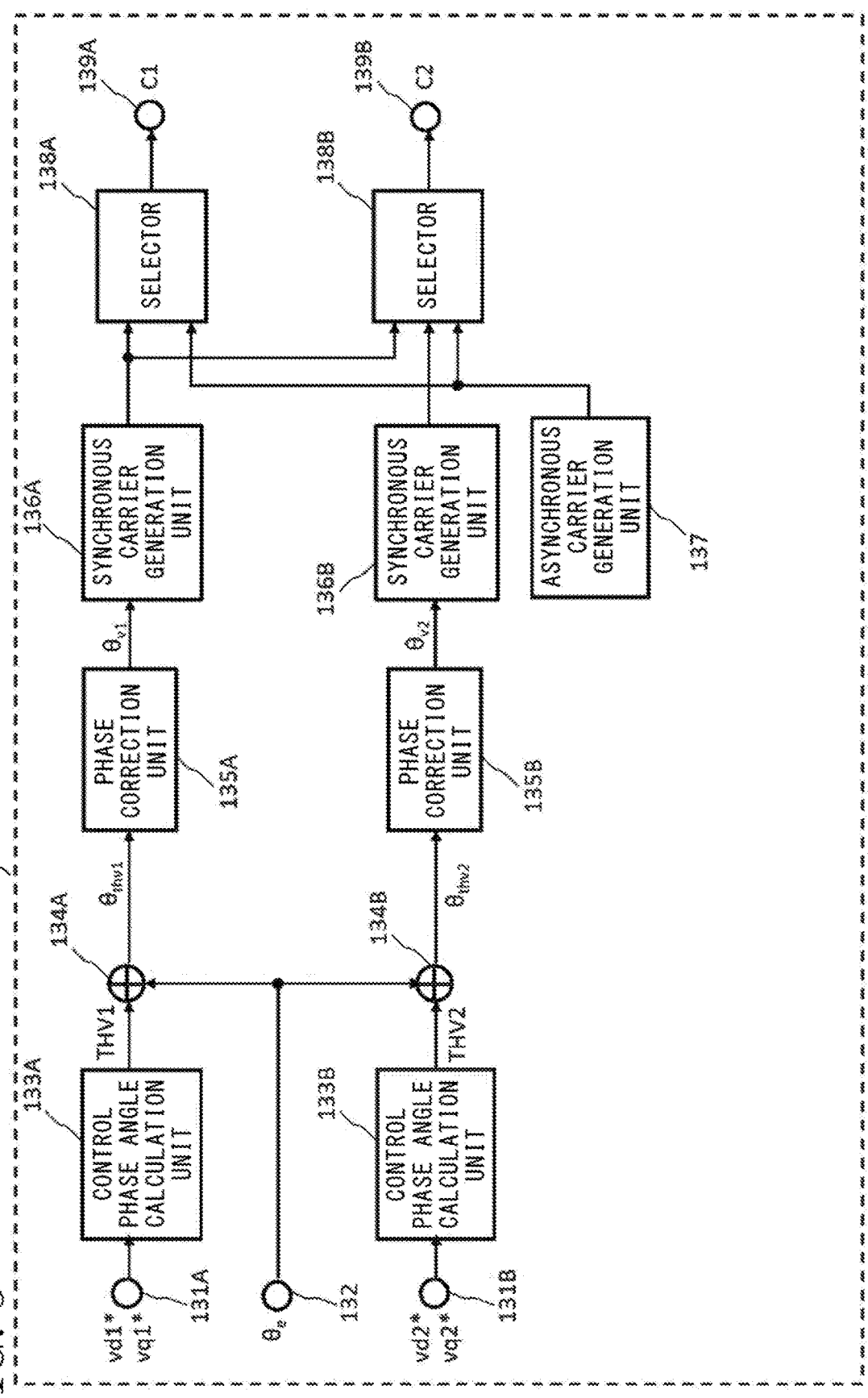
FIG. 3 is a detailed block diagram showing the configuration of a carrier generation unit according to embodiment 1 of the present invention.

Next, the carrier generation unit 13 will be described in more detail. FIG. 3 is a detailed block diagram showing the configuration of the carrier generation unit shown in FIG. 1. In the carrier generation unit 13, the first group voltage commands vd1*, vq1* and the second group voltage commands vd2*, vq2* are inputted to a first group voltage command input terminal 131A and a second group voltage command input terminal 131B, respectively, and the magnetic pole position signal θe is inputted to a magnetic pole position signal input terminal 132. The first group voltage commands vd1*, vq1* inputted to the carrier generation unit 13 are inputted to a first control phase angle calculation unit 133A, and the first control phase angle calculation unit 133A calculates a first control phase angle THV1 from the first group voltage commands vd1*, vq1*. The first control phase angle THV1 and the magnetic pole position signal θe are added by a first adder 134A, and an output θthv1 of the first adder 134A is inputted to the first phase correction unit 135A. Meanwhile, the second group voltage commands vd2*, vq2* inputted to the carrier generation unit 13 are inputted to the second control phase angle calculation unit 133B, and the second control phase angle calculation unit 133B calculates a second control phase angle THV2 from the second group voltage commands vd2*, vq2*. The second control phase angle THV2 and the magnetic pole position signal θe are added by a second adder 134B, and an output θthv2 from the second adder 134B is inputted to the second phase correction unit 135B.

The first phase correction unit 135A causes the phase of the output θthv1 of the first adder 134A to lag by 90° and performs a predetermined correction thereon, and the result is outputted as a first voltage phase θv1 to a first synchronous carrier generation unit 136A. The second phase correction unit 135B causes the phase of the output θthv2 of the second adder 134B to lag by 90° and corrects the phase by an electric-angle phase difference θoffset between the winding group of the first group and the winding group of the second group. The result is outputted as a second voltage phase θv2 to a second synchronous carrier generation unit 136B.

The first synchronous carrier generation unit 136A generates a first synchronous carrier signal synchronized with the first group voltage commands vd1*, vq1*, using the first voltage phase θv1, and outputs the first synchronous carrier signal to a first selector 138A and a second selector 138B. The second synchronous carrier generation unit 136B generates a second synchronous carrier signal synchronized with the second group voltage commands vd2*, vq2*, using the second voltage phase θv2, and outputs the second synchronous carrier signal to the second selector 138B. In addition, an asynchronous carrier generation unit 137 generates an asynchronous carrier signal formed of triangle waves having a constant frequency, and outputs the asynchronous carrier signal to the first selector 138A and the second selector 138B.

The first selector 138A outputs one carrier signal selected from the two carrier signals (the first synchronous carrier signal and the asynchronous carrier signal), as the first carrier signal C1, to a first output terminal 139A. The first output terminal 139A outputs the first carrier signal C1 to the first switching pulse generation unit 15A. The second selector 138B outputs one carrier signal selected from the three carrier signals (the first synchronous carrier signal, the second synchronous carrier signal, and the asynchronous carrier signal), as the second carrier signal C2, to a second output terminal 139B. The second output terminal 139B outputs the second carrier signal C2 to the second switching pulse generation unit 15B. Selection of the carrier signals in the first selector 138A and the second selector 138B will be described later.

Next, operation of the carrier generation unit 13 will be described in more detail. In the case of generating the synchronous carrier signals to be respectively used for PWM control for the winding group of the first group and the winding group of the second group, the first voltage phase θv1 is generated from the first control phase angle THV1 and the magnetic pole position signal θe, and the second voltage phase θv2 is generated from the second control phase angle THV2 and the magnetic pole position signal θe.

In the case of generating the synchronous carrier signal to be used only for PWM control for the winding group of the first group, and in the case of generating the synchronous carrier signal to be used in common for PWM control for both winding groups, the voltage phase therefor is calculated from the first control phase angle THV1 and the magnetic pole position signal θe, and the voltage phase for the synchronous carrier signal to be used for PWM control for the winding group of the second group is calculated from the second control phase angle THV2 and the magnetic pole position signal θe.

The first control phase angle calculation unit 133A calculates the first control phase angle THV1 by calculation of Expression (9) using the first group voltage commands vd1*, vq1*.

[Mathematical 9]

$$THV1 = \tan^{-1}\left(\frac{vq1^*}{vd1^*}\right) \quad (9)$$

The second control phase angle calculation unit 133B calculates the second control phase angle THV2 by calculation of Expression (10) using the second group voltage commands vd2*, vq2*.

[Mathematical 10]

$$THV2 = \tan^{-1}\left(\frac{vq2^*}{vd2^*}\right) \quad (10)$$

The first voltage phase θv1 is calculated from Expression (11) using the magnetic pole position signal θe and a phase adjustment amount α, by the first adder 134A and the first phase correction unit 135A.

[Mathematical 11]

$$\theta v1 = THV1 + \theta e - \frac{\pi}{2} + \alpha \quad (11)$$

Adjustment by the phase adjustment amount α in the first phase correction unit 135A in calculation by Expression (11) is for performing correction of shifting the phase of a common synchronous carrier signal in the case of using the carrier signal synchronized with the first group voltage commands vd1*, vq1* as the common synchronous carrier signal for synchronous PWM control for the winding group of the first group and the winding group of the second group. Such correction can adjust a specific frequency component contained in the second group switching pulses generated by the second switching pulse generation unit 15B, whereby the magnitudes of fundamental waves contained in the first group switching pulse and the second group switching pulse can be made equal to each other. For example, in the case where the electric-angle phase difference θoffset between the winding group of the first group and the winding group of the second group is 30°, the phase adjustment amount α is set to 15° (½ of phase difference). It is noted that such correction processing is performed as necessary and is not essential in the present invention.

The second voltage phase θv2 is calculated from Expression (12) using the magnetic pole position signal ee and the electric-angle phase difference θoffset between the winding group of the first group and the winding group of the second group, by the second adder 134B and the second phase correction unit 135B. Therefore, adjustment as in the above adjustment by the phase adjustment amount α is not performed in calculation of the second voltage phase θv2.

[Mathematical 12]

$$\theta v2 = THV2 + \theta e - \frac{\pi}{2} + \theta \text{offset} \quad (12)$$

The carrier signals generated on the basis of the first voltage phase θv1 and the second voltage phase θv2 calculated as described above become synchronous with the first group three-phase voltage commands vu1*, vv1*, vw1* and the second group three-phase voltage commands vu2*, vv2*, vw2*, respectively.

The first synchronous carrier generation unit 136A generates the first synchronous carrier signal synchronized with the first group three-phase voltage commands vu1*, vv1*, vw1*, on the basis of the first voltage phase θv1 outputted from the first phase correction unit 135A. The synchronous carrier signal is a triangle wave having a frequency that is three, six, nine, or fifteen times the frequency of the voltage commands, for example. By performing triangle wave comparison using the above synchronous carrier signal, the number of pulses in the switching pulses per one cycle of the voltage commands can be controlled. The first synchronous carrier generation unit 136A in embodiment 1 outputs a synchronous carrier signal in which the number of pulses is set to any of pulse numbers such as nine, six, three, and the like in accordance with the rotation speed of the multiplex-winding electric motor 83, the frequency of the voltage commands, and the modulation factor of the voltage commands. As described later, there are a case where the first synchronous carrier signal generated by the first synchronous carrier generation unit 136A is used for only PWM control of the winding group of the first group, and a case where the first synchronous carrier signal is used for PWM control of the winding groups of the first group and the second group in common. Similarly, the second synchronous carrier generation unit 136B generates the second synchronous carrier signal synchronized with the second group three-phase voltage commands vu2*, vv2*, vw2*, on the basis of the second voltage phase θv2 outputted from the second phase correction unit 135B.

The asynchronous carrier generation unit 137 generates an asynchronous carrier signal which is a triangle wave having a constant frequency of, for example, 10 kHz and which is not synchronized with the voltage commands.

The first selector 138A selects one of the first synchronous carrier signal and the asynchronous carrier signal, and outputs the selected carrier signal as the first carrier signal C1. The first carrier signal C1 is outputted to the first switching pulse generation unit 15A via the first output terminal 139A. In the selection for the first carrier signal C1, for example, when the operation state of the multiplex-winding electric motor 83 is determined to be in a low-speed region, the asynchronous carrier signal is selected, and when the operation state is determined to be in a middle-speed region or a high-speed region, the first synchronous carrier signal is selected.

The second selector 138B selects one of the first synchronous carrier signal, the second synchronous carrier signal, and the asynchronous carrier signal, and outputs the selected carrier signal as the second carrier signal C2. The second carrier signal C2 is outputted to the second switching pulse generation unit 15B via the second output terminal 139B. In the selection for the second carrier signal C2, for example, when the operation state of the multiplex-winding electric motor 83 is determined to be in a low-speed region, the asynchronous carrier signal is selected; when the operation state is determined to be in a middle-speed region, the first synchronous carrier signal is selected; and when the operation state is determined to be in a high-speed region, the second synchronous carrier signal is selected.

In the present invention, a control mode in which the first selector 138A and the second selector 138B select the asynchronous carrier signal is referred to as "asynchronous PWM control mode", a control mode in which the first selector 138A and the second selector 138B select the carrier signal (in embodiment 1, the first synchronous carrier signal) synchronized with the voltage commands for a specific winding group is referred to as "first synchronous PWM control mode", and a control mode in which the first selector 138A and the second selector 138B select the individual carriers (the first synchronous carrier signal and the second synchronous carrier signal) synchronized with the respective voltage commands is referred to as "second synchronous PWM control mode".

The determination for which region the operation state of the multiplex-winding electric motor 83 belongs to can be performed on the basis of the rotation speed of the multiplex-winding electric motor 83, for example. Specifically, with two thresholds set, if the rotation speed of the multiplex-winding electric motor 83 is smaller than the smaller threshold, the operation state is determined to be in a low-speed region; if the rotation speed is not less than the smaller threshold and is smaller than the greater threshold, the operation state is determined to be in a middle-speed region; and if the rotation speed is not less than the greater threshold, the operation state is determined to be in a high-speed region. With this configuration, the carrier generation unit 13 can selectively output the carrier signal in accordance with the operation state of the multiplex-winding electric motor 83, in control of the first power converter 81A and the second power converter 81B. The operation state may be determined on the basis of the frequency or the modulation factor of the voltage commands. The determination basis or the thresholds may be the same between the first selector 138A and the second selector 138B, or may be different therebetween.

Figure 4:
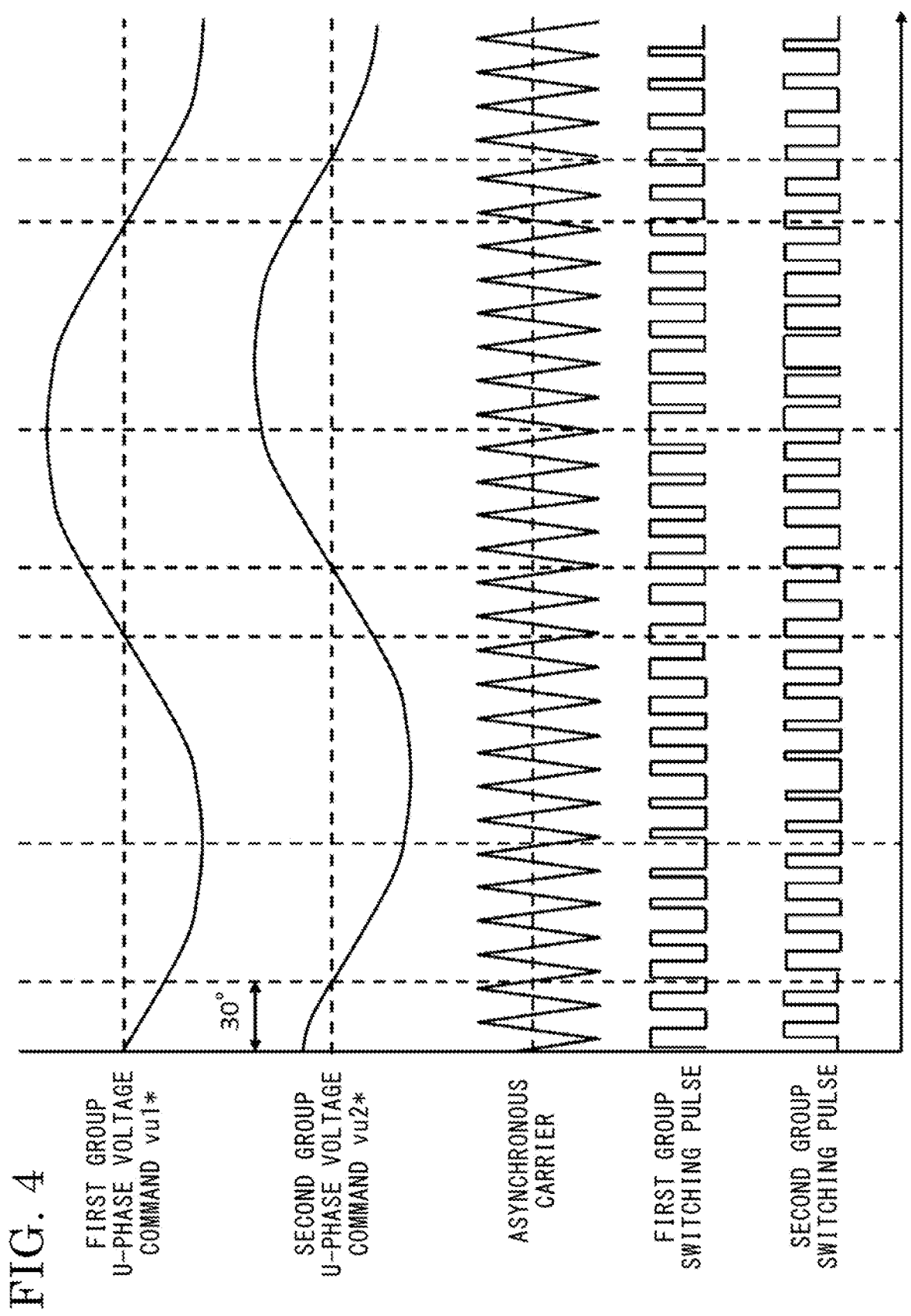
FIG. 4 is a timing chart showing the relationship among voltage commands for respective winding groups, an asynchronous carrier signal, and switching pulses for the respective winding groups, according to embodiment 1 of the present invention.

Here, generation of switching pulses by the triangle wave comparison processing will be described. FIG. 4 is a timing chart showing the relationship among the voltage commands for the respective winding groups, the asynchronous carrier signal, and switching pulses for the respective winding groups in embodiment 1, and shows the switching pulses generated through triangle wave comparison in asynchronous PWM control. In FIG. 4, the relationship among the first group U-phase voltage command vu1*, the second group U-phase voltage command vu2*, the asynchronous carrier signal, the first group U-phase switching pulse, and the second group U-phase switching pulse, is shown, and the phase difference between the voltage commands is set to 30° on the basis of the electric phase difference between the winding group of the first group and the winding group of the second group in the multiplex-winding electric motor 83. In the asynchronous PWM control shown in FIG. 4, the first group U-phase switching pulse is generated on the basis of the magnitude comparison between the first group U-phase voltage command vu1* and the asynchronous carrier signal at each time. In the case where the first group U-phase voltage command vu1* is greater, the first group U-phase switching pulse is ON, and in the case where the asynchronous carrier signal is greater, the first group U-phase switching pulse is OFF. Similarly, the second group switching pulse is generated on the basis of the magnitude comparison between the second group U-phase voltage command vu2* and the asynchronous carrier signal at each time. It is noted that the phase difference between the first group and the second group shown in FIG. 4 is merely an example, and is not limited thereto.

Such a switching pulse is generated for each of U phase, V phase, and W phase of the three-phase voltage commands. However, the switching pulses for V phase and W phase merely have different phases as a whole relative to the switching pulse for U phase, and except for this, they are the same. Therefore, the description thereof is omitted. The feature of generating the switching pulse on the basis of the magnitude relationship between the carrier signal and the voltage command as described above also applies to the case of synchronous PWM control described below.

Figure 5:
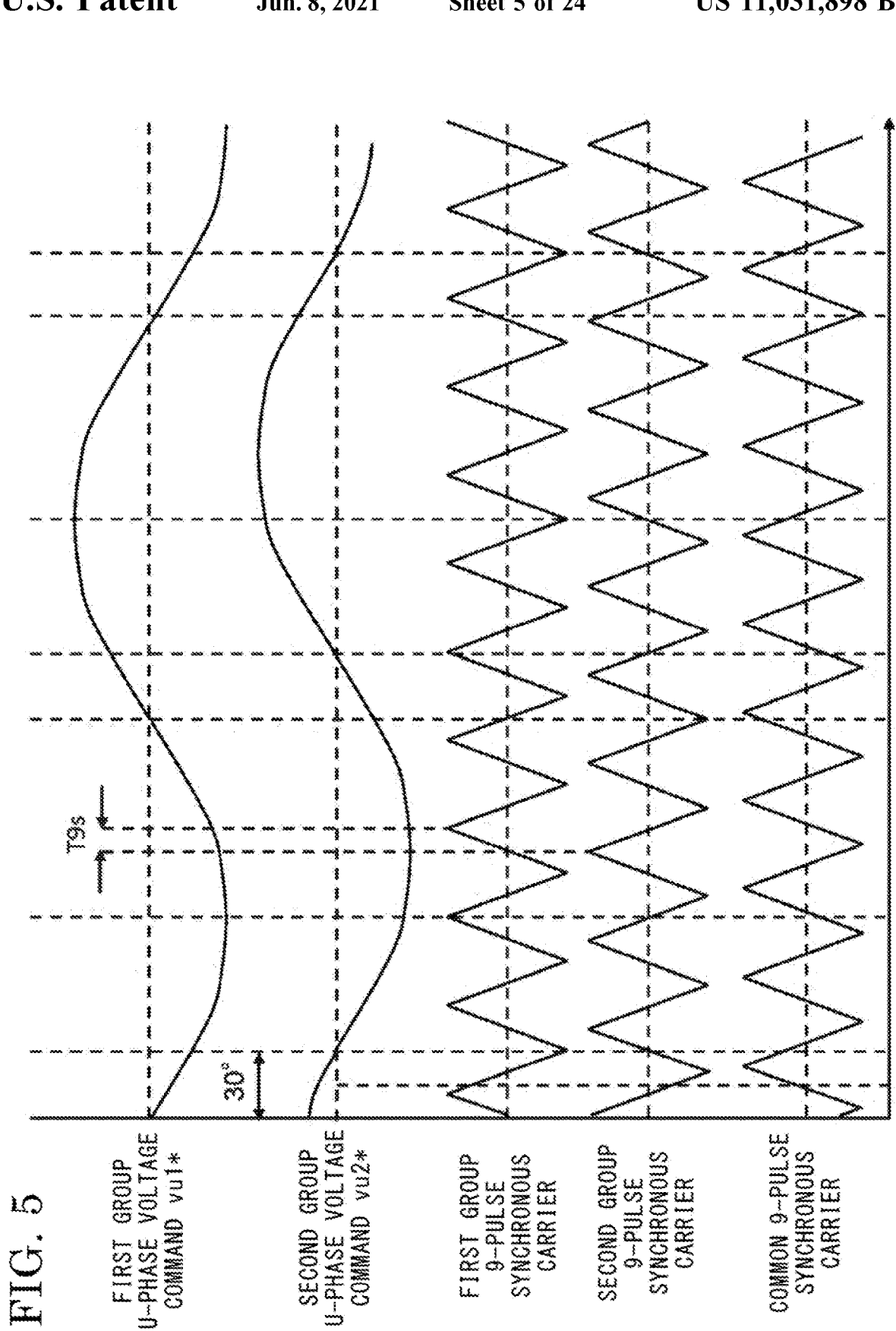
FIG. 5 is a timing chart showing the relationship among voltage commands for respective winding groups and carrier signals for the respective winding groups in 9-pulse synchronous PWM control, according to embodiment 1 of the present invention.

FIG. 5 is a timing chart showing the relationship among the voltage commands for the respective winding groups and the carrier signals for the respective winding groups in 9-pulse synchronous PWM control in embodiment 1, and shows the relationship among the first group U-phase voltage command vu1*, the second group U-phase voltage command vu2*, the first-group synchronous carrier signal, the second-group synchronous carrier signal, and the common synchronous carrier signal. The first group U-phase voltage command vu1*, the first-group synchronous carrier signal, and the synchronous carrier signal used in common for both winding groups are synchronized with the first voltage phase θv1. The second group U-phase voltage command vu2* and the second-group synchronous carrier signal are synchronized with the second voltage phase θv2. In the 9-pulse synchronous PWM control, a synchronous carrier signal that has a frequency nine times the frequency of the first voltage command and is synchronized with the first voltage phase θv1 is generated so that nine ON/OFF switching operations are performed per one cycle of the first voltage phase θv1 and the second voltage phase θv2.

In the case where the electric phase difference between the winding group of the first group and the winding group of the second group in control of the multiplex-winding electric motor 83 is 30° and the first group voltage command and the second group voltage command are in the same condition, if a carrier signal synchronized with the first group U-phase voltage command vu1* and a carrier signal synchronized with the second group U-phase voltage command vu2* are generated independently of each other, the first-group synchronous carrier signal and the second-group synchronous carrier signal have a carrier phase difference of 90° as shown in FIG. 5, where one carrier cycle is defined as 360°. Calculation of the voltage commands for both winding groups in PI control involving the inter-group interference prevention processing, coordinate conversion from an orthogonal two-phase coordinate system to a three-phase coordinate system, and coordinate conversion from a three-phase coordinate system to an orthogonal two-phase coordinate system, need to be finished within a time period T9s corresponding to the interval between a top of the first-group synchronous carrier signal and a top of the second-group synchronous carrier signal. The time period T9s is determined by the phase difference between the two carrier signals, and the phase difference between the carrier signals varies when the voltage command for one winding group is updated. On the other hand, in the case of performing synchronous PWM control using the common synchronous carrier signal without using the two carrier signals, the voltage command calculation and the like only have to be finished between a top and a bottom of the common synchronous carrier signal, and since the time period for calculating the voltage commands is not influenced by the phase difference between the two carrier signals, the time period for calculating the voltage commands does not greatly vary even when the voltage commands are updated. That is, if the common synchronous carrier signal is used, variation in the time period for calculating the voltage commands can be suppressed, and in performing the inter-group interference prevention processing using the sums and the differences of the currents of both winding groups, voltage command calculation can be stably executed. As the common synchronous carrier signal, either the carrier signal synchronized with the first group voltage command or the carrier signal synchronized with the second group voltage command may be used. In embodiment 1, the carrier signal synchronized with the first group voltage command is used.

In the case where the first-group synchronous carrier signal is used as the common synchronous carrier signal for synchronous PWM control for the winding group of the second group, it is desirable to use the first-group synchronous carrier signal for which the phase is corrected in accordance with the amount of the phase difference between the first group voltage command and the second group voltage command. For example, in embodiment 1, the first-group synchronous carrier signal for which the phase is shifted by 15° which is ½ of the phase difference θoffset between the winding groups of the first group and the second group is used as the common synchronous carrier signal. As described above, the first synchronous carrier signal corrected by a phase correction amount determined on the basis of the electric-angle phase difference between the winding group of the first group and the winding group of the second group is used as the common synchronous carrier signal, whereby the content rate of a fundamental wave component contained in the switching pulses by synchronous PWM control for the first group and the content rate of a fundamental wave component contained in the switching pulses by synchronous PWM control for the second group become equal to each other, and thus it becomes possible to perform further stable control. It is noted that synchronous PWM control by the common synchronous carrier signal can be performed even without performing phase correction as described above. In the case where there is no electric phase difference between the winding group of the first group and the winding group of the second group, the first-group synchronous carrier signal can be used as the common synchronous carrier signal without performing phase correction as described above.

Figure 6:
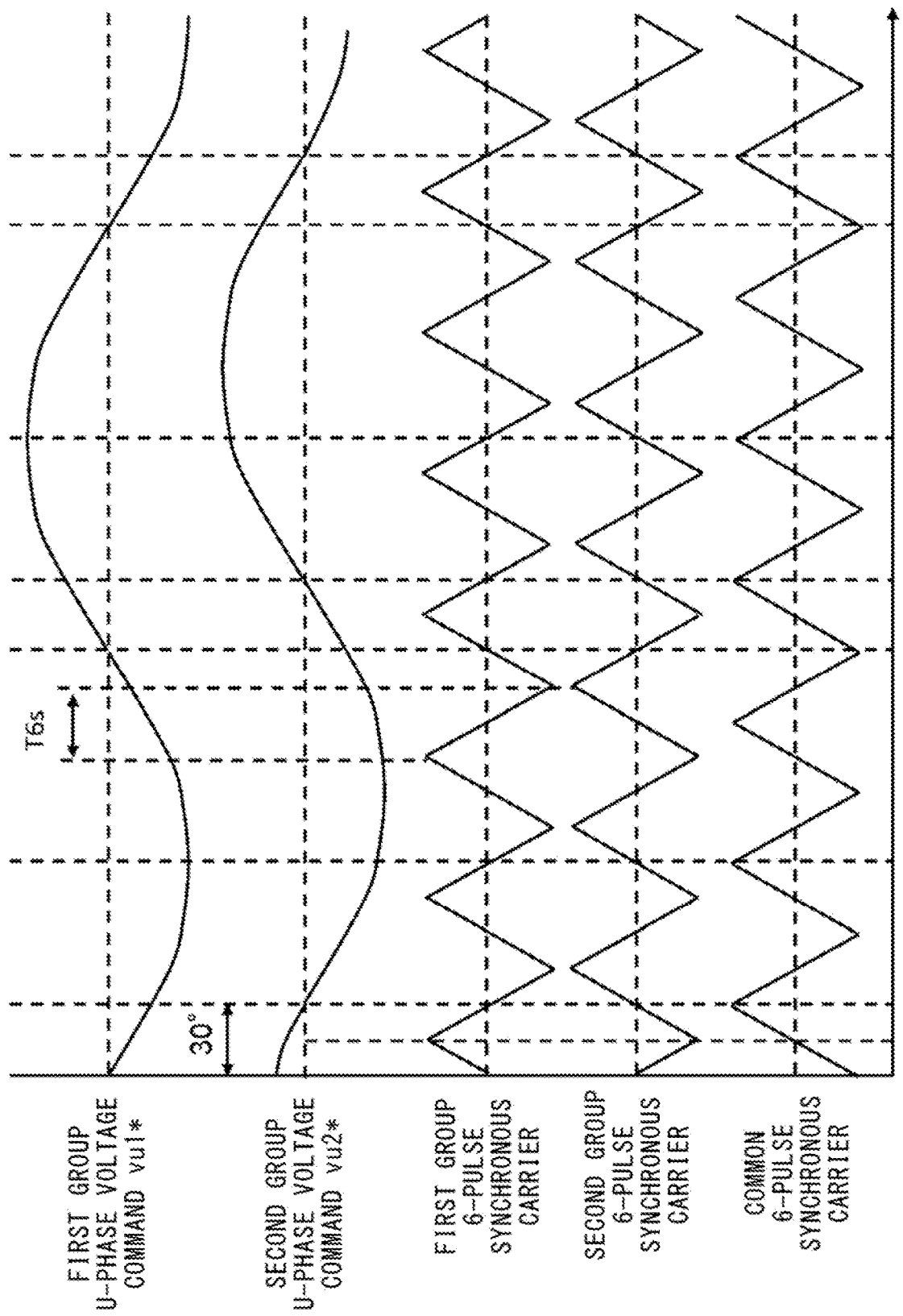
FIG. 6 is a timing chart showing the relationship among voltage commands for respective winding groups and carrier signals for the respective winding groups in 6-pulse synchronous PWM control, according to embodiment 1 of the present invention.

FIG. 6 is a timing chart showing the relationship among the voltage commands for the respective winding groups and the carrier signals for the respective winding groups in 6-pulse synchronous PWM control in embodiment 1. In the case where the electric phase difference between the winding group of the first group and the winding group of the second group is 30° and the first group U-phase voltage command vu1* and the second group U-phase voltage command vu2* are in the same condition, the first-group synchronous carrier signal and the second-group synchronous carrier signal have a carrier phase difference of 180° as shown in FIG. 6. Here, a time period T6s is the interval between a top of the first-group synchronous carrier signal and a top of the second-group synchronous carrier signal, and is a time period for calculating the voltage commands as in the case of 9 pulse.

In the case of 6-pulse synchronous PWM control, in executing calculation in synchronization with the carrier signal for each winding group, if there is a carrier phase difference of 180°, the timing of a top (bottom) of the first-group synchronous carrier signal and the timing of a bottom (top) of the second-group synchronous carrier signal coincide with each other. Thus, acquisition of current information and update of the voltage commands are performed doubly in a short time, so that voltage command calculation might not be performed correctly. Therefore, also in the case of 6-pulse synchronous PWM control, synchronous PWM control is performed using the common synchronous carrier signal, whereby voltage command update and the like are prevented from being doubly executed. In the case of performing synchronous PWM control for the second group by using the first-group synchronous carrier signal, it is desirable that the first-group synchronous carrier signal for which the phase is shifted by 15° is used as the common synchronous carrier signal. This is to equalize the content rates of fundamental wave components in the first group switching pulse and the second group switching pulse as in the case of 9 pulse described in FIG. 5. In the case where there is no electric phase difference between the winding group of the first group and the winding group of the second group, the first-group synchronous carrier signal can be used as the common synchronous carrier signal without performing phase correction as described above.

Figure 7:
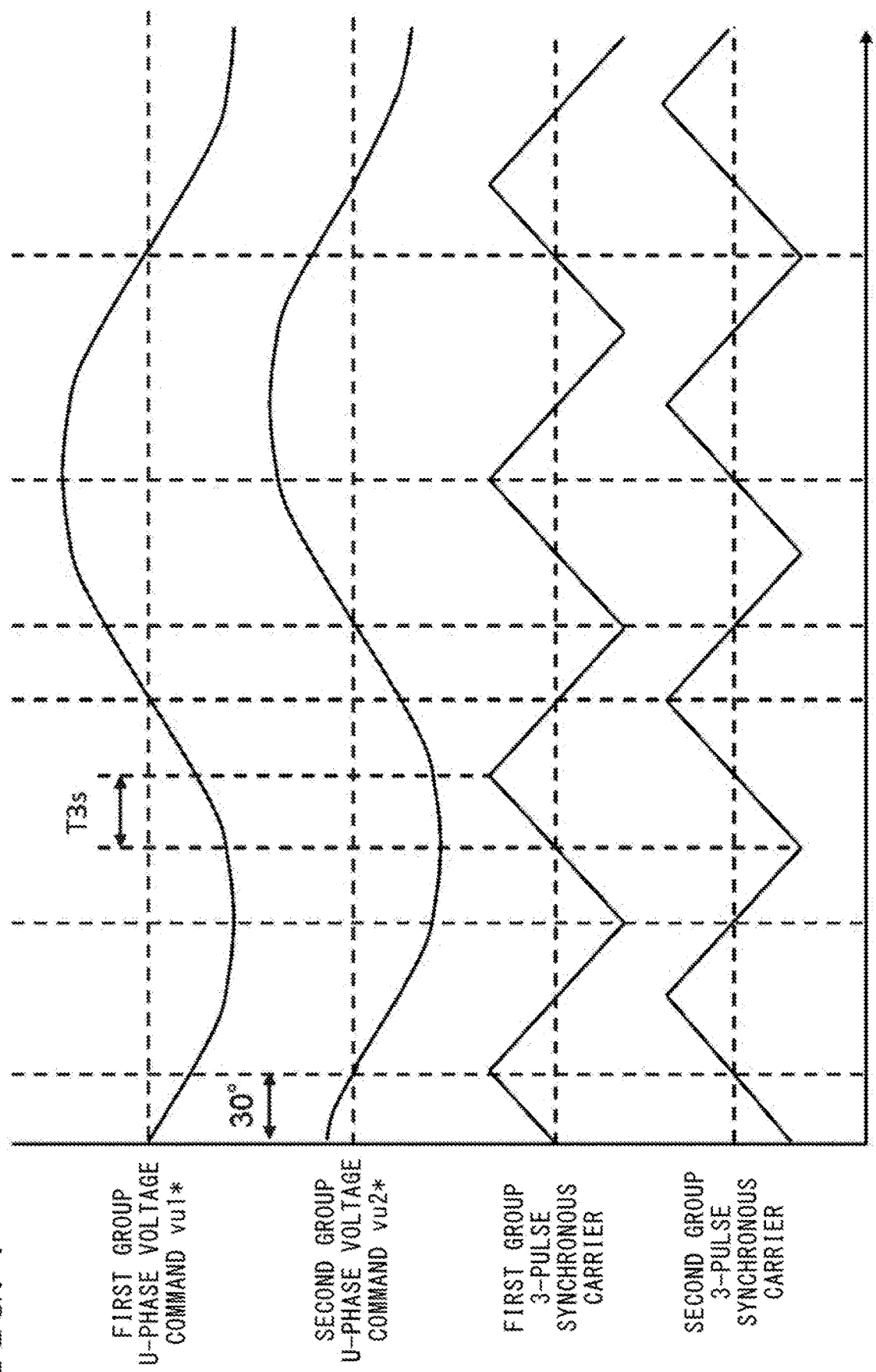
FIG. 7 is a timing chart showing the relationship among voltage commands for respective winding groups and carrier signals for the respective winding groups in 3-pulse synchronous PWM control, according to embodiment 1 of the present invention.

FIG. 7 is a timing chart showing the relationship among the voltage commands for the respective winding groups and the carrier signals for the respective winding groups in 3-pulse synchronous PWM control in embodiment 1. In the case of 3 pulse, the first-group synchronous carrier signal and the second-group synchronous carrier signal have a carrier phase difference of 90° as in the case of 9 pulse. Meanwhile, in the 3-pulse synchronous PWM control, as compared to the case of 9 pulse and 6 pulse, the cycle of the carrier signal becomes longer, and a time period T3s for calculating the voltage commands, which corresponds to the interval between a top of the first-group synchronous carrier signal and a top of the second-group synchronous carrier signal, is sufficiently long. Therefore, even if the length of T3s varies due to voltage command update, a sufficient calculation time can be obtained for voltage command calculation, coordinate conversion, and inter-group interference prevention processing. Therefore, in 3-pulse synchronous PWM control, even if voltage command calculation is performed in accordance with two timings of the carrier signal synchronized with the first group voltage command and the carrier signal synchronized with the second group voltage command, the calculation time does not become insufficient, and it is possible to stably control the multiplex-winding electric motor 83.

Figure 8:
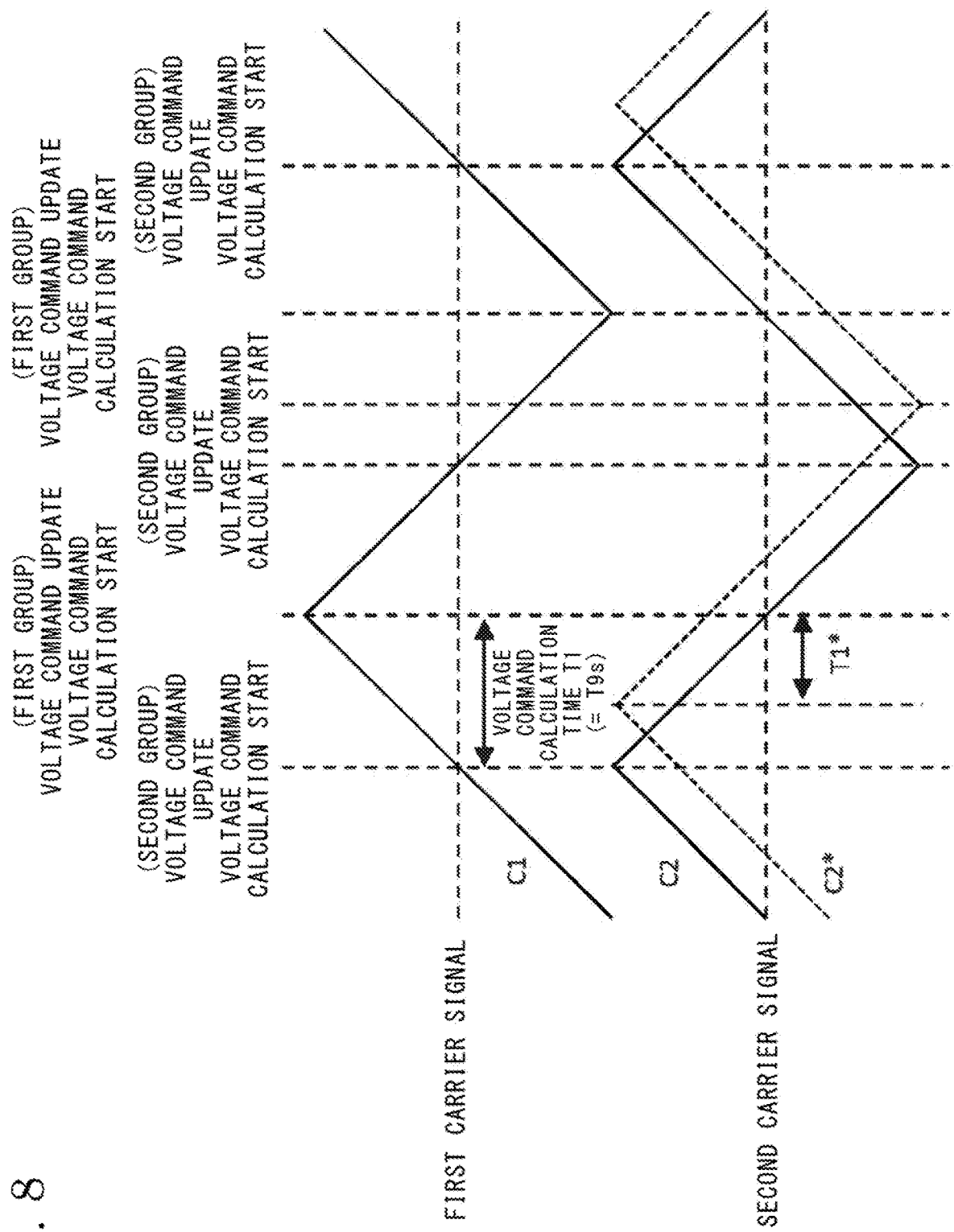
FIG. 8 shows calculation timings in the case of performing voltage command calculation between tops and bottoms of carrier signals for both winding groups in synchronous PWM control, according to embodiment 1 of the present invention.

FIG. 8 shows processing timings in the case of performing voltage command calculation between tops and bottoms of the carrier signals for both winding groups in synchronous PWM control in embodiment 1, and shows the case of 9-pulse synchronous PWM control. In 9-pulse synchronous PWM control, the first carrier signal C1 to be used for generating the first group switching pulse and the second carrier signal C2 to be used for generating the second group switching pulse have a carrier phase difference of 90°. In FIG. 8, first, at the timing of a top of the second carrier signal C2, the second group voltage command is updated, and at the same time, a phase current value of current flowing through the winding group of the second group is acquired to start the next calculation of the second group voltage command (including the accompanying coordinate conversion calculation and the like; the same applies hereafter). Next, at the timing of a top of the first carrier signal C1, the first group voltage command is updated, and at the same time, a phase current value of current flowing through the winding group of the first group is acquired to start the next calculation of the first group voltage command. Subsequently, at the timing of a bottom of the second carrier signal C2 and then the timing of a bottom of the first carrier signal C1, voltage command update and acquisition of the phase current value (start of voltage command calculation) are repeated for the respective winding groups.

As described above, in the case where PI control is performed using the sum and the difference of current values for the inter-group interference prevention processing in voltage command calculation for both winding groups of the first group and the second group, voltage command update for one winding group influences voltage command calculation for the other winding group. Therefore, it is necessary to finish voltage command calculation, coordinate conversion calculation, and the like within a calculation time T1 (equal to T9s in the case of 9 pulse) between timings of tops and bottoms of the first carrier signal C1 and tops and bottoms of the second carrier signal C2. However, as described above, when current control is performed, the voltage command varies, and as the voltage command varies, the voltage phase also varies. Thus, the synchronous carrier signal synchronized with the voltage phase also varies as a result of current control. The phase variation in the synchronous carrier signal causes the voltage command calculation time to vary. For example, if the second carrier signal C2 becomes a carrier signal as shown by C2* in FIG. 8, the voltage command calculation time T1 varies and shortens to be T1*, so that there is a possibility that the calculation cannot be finished to the end. Therefore, in the case where it is expected that the calculation time cannot be ensured sufficiently, it is necessary to suppress variation in the calculation time.

In addition, even in the case of not performing the inter-group interference prevention processing using the current values of the first group and the second group, if there is a circuit that operates in coordination with calculation of voltage commands for the first group and the second group, it is necessary to finish voltage command calculation for one winding group before voltage command calculation for the other winding group is started. For example, in the configuration shown in FIG. 1, it is assumed that, in analog/digital (A/D) conversion of data of the phase current, a plurality of current values are subjected to A/D conversion by time division multiplexing using one A/D converter. In this case, if the timings of acquiring phase currents of the respective winding groups are synchronized with the respective carrier signals, there is a possibility that A/D conversion cannot be finished in time, depending on the phase relationship between the first carrier signal C1 and the second carrier signal C2. This applies to not only the case of A/D conversion but also the case of sharing a memory for a lookup table (LUT) or a calculation module for trigonometric functions, for example.

Figure 9:
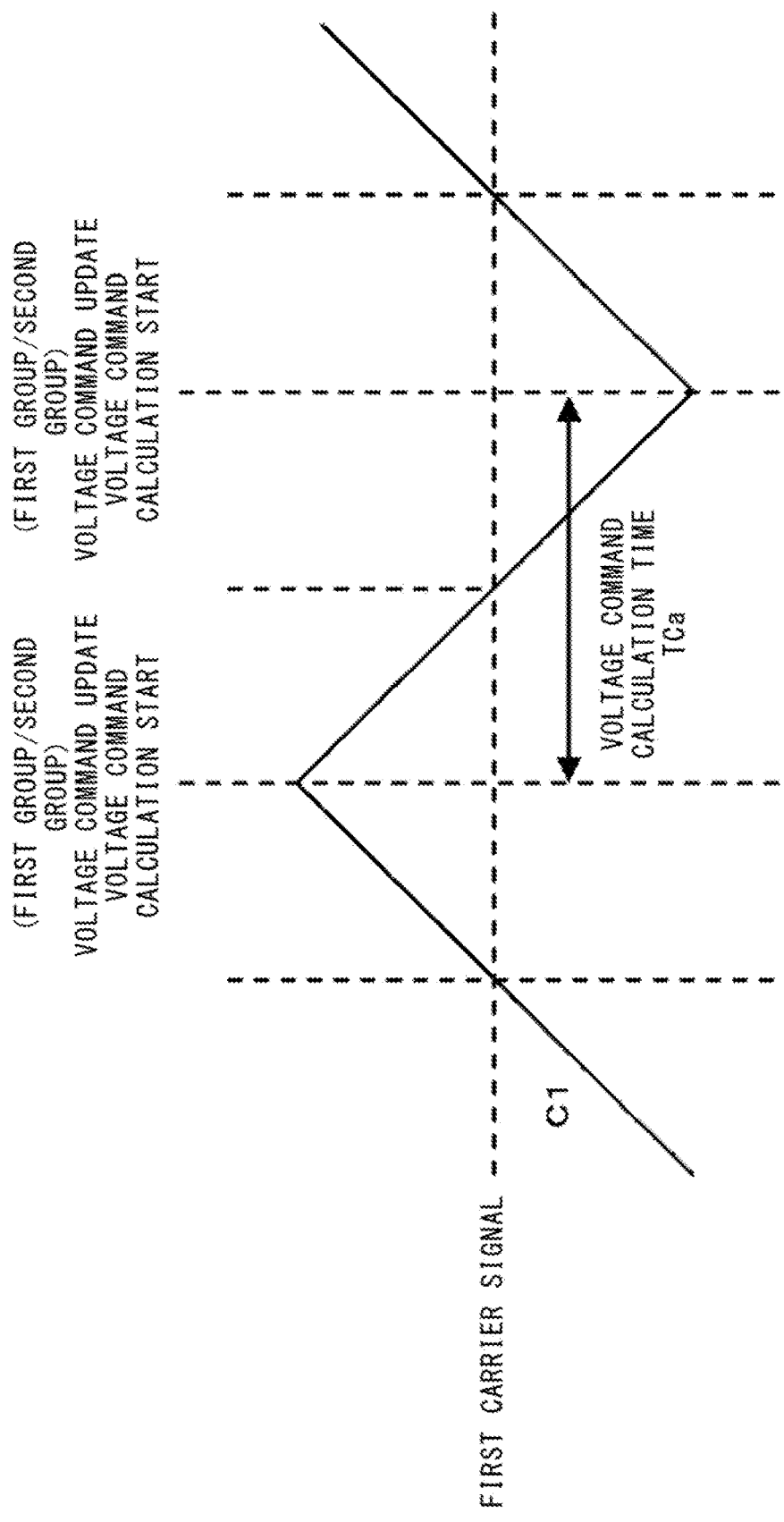
FIG. 9 shows calculation timings in the case of performing voltage command calculation between a top and a bottom of a carrier signal for one winding group in synchronous PWM control, according to embodiment 1 of the present invention.

FIG. 9 shows processing timings in the case of performing voltage command calculation between a top and a bottom of the carrier signal for one winding group in synchronous PWM control in embodiment 1, and shows operation synchronized with the timings of a top and a bottom of the carrier signal in the case of performing PWM control using the common synchronous carrier signal. In FIG. 9, voltage command update and current value acquisition (start of voltage command calculation) for both winding groups of the first group and the second group are executed at timings based on the first carrier signal C1. Therefore, starts and ends of the voltage commands are synchronized with one carrier signal. Thus, variation in a voltage command calculation time TCa is suppressed and voltage command calculation can be stably performed. Similarly, also in the case where an AD converter, a memory for a lookup table (LUT) of a trigonometric function, or the like is shared in calculation for the first group and the second group, voltage command calculation can be stably performed.

Figure 10:
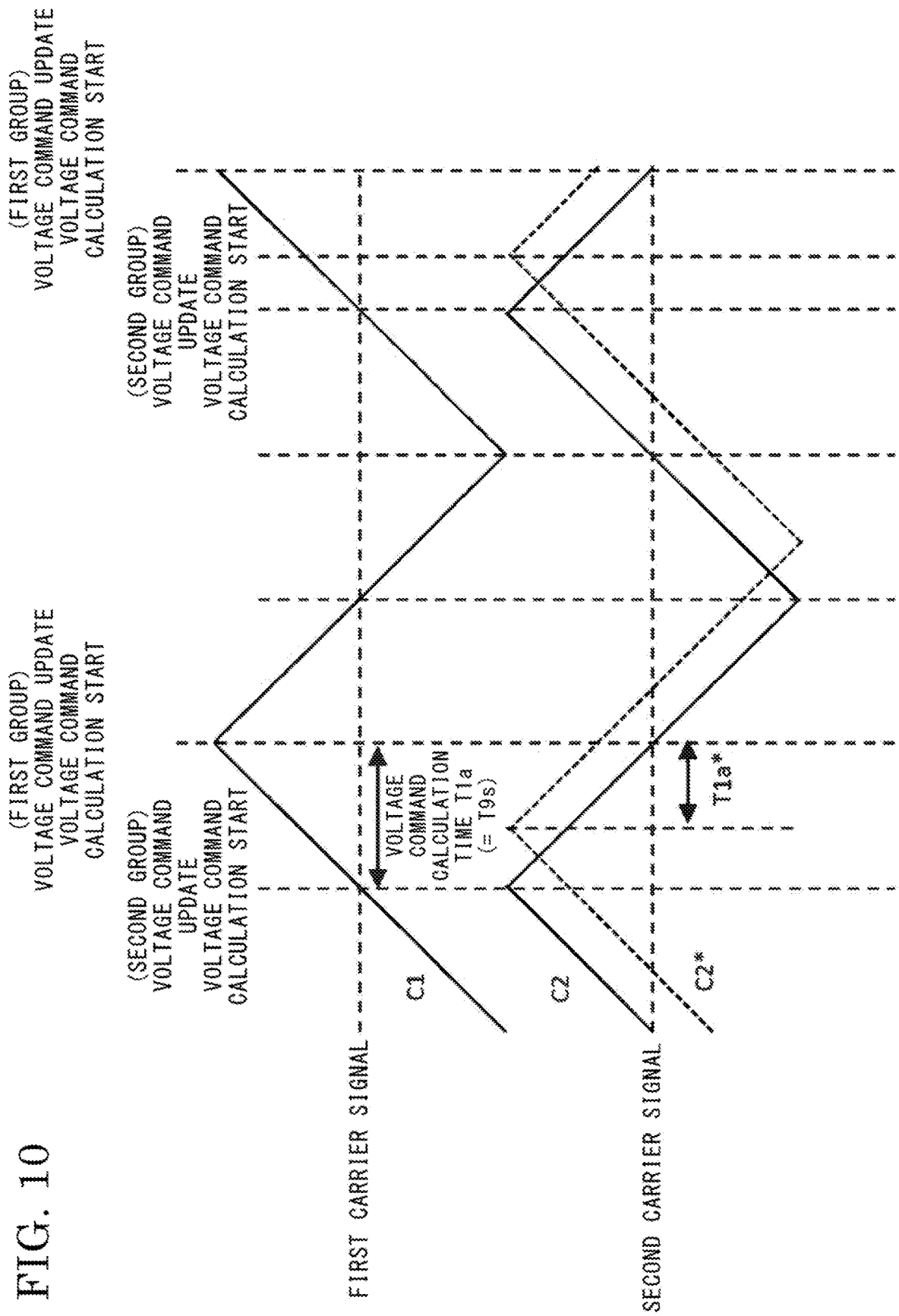
FIG. 10 shows calculation timings in the case of performing voltage command calculation between tops of carrier signals for both winding groups in synchronous PWM control, according to embodiment 1 of the present invention.

FIG. 10 shows processing timings in the case of, unlike the example in FIG. 8, performing voltage command calculation between tops of the carrier signals for both winding groups in synchronous PWM control in embodiment 1, and shows timings of current value acquisition (start of voltage command calculation) and voltage command update for both winding groups in the case where voltage command calculations for both winding groups of the first group and the second group are synchronized with tops of the respective carrier signals. In the case of performing PI control using the sums and the differences of the current values for voltage command calculation for both winding groups of the first group and the second group for the purpose of the inter-group interference prevention processing, it is necessary to finish calculations for the voltage commands, coordinate conversion, and the like between the timing of a top of the first carrier signal C1 and the timing of a top of the second carrier signal C2. As in the case of FIG. 9, when current control is performed, the synchronous carrier synchronized with the voltage command also varies. Therefore, when the second carrier signal C2 becomes a carrier signal as shown by C2*, the voltage command calculation time T1$a$ shown in FIG. 10 varies and the voltage command calculation time is shortened to T1$a$*, so that there is a possibility that voltage command calculation cannot be finished to the end.

Figure 11:
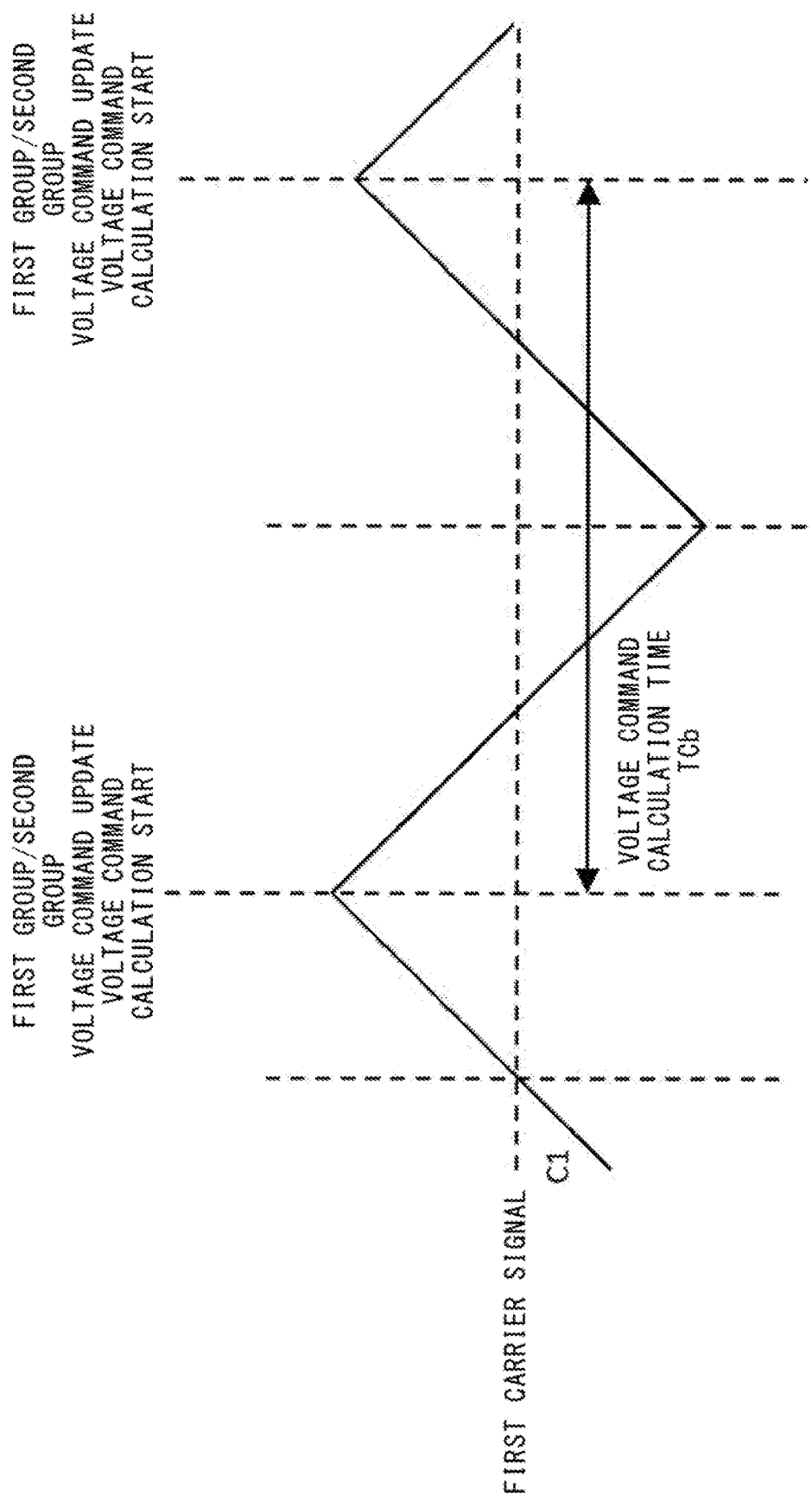
FIG. 11 shows calculation timings in the case of performing voltage command calculation between tops of a carrier signal for one winding group in synchronous PWM control, according to embodiment 1 of the present invention.

FIG. 11 shows processing timings in the case of performing voltage command calculation between tops of the carrier signal for one winding group in synchronous PWM control in embodiment 1, and shows timings of current value acquisition (start of voltage command calculation) and voltage command update for both winding groups in the case where calculations of the first group voltage command and the second group voltage command are synchronized with a top of the common synchronous carrier signal. In this case, since phase voltage command update and current value acquisition (start of voltage command calculation) for both winding groups of the first group and the second group are executed in synchronization with a top of the first carrier signal C1, variation in the voltage command calculation time TCb is suppressed and voltage command calculation can be stably performed.

FIG. 12 shows the relationship between the operation state of the multiplex-winding electric motor and the type of a carrier signal used in PWM control in embodiment 1. In embodiment 1, the operation state is determined on the basis of the rotation speed of the multiplex-winding electric motor 83.

In the case where the rotation speed is low and the operation state is in a low-speed region, the control mode is set to the "asynchronous PWM control mode". The first selector 138A and the second selector 138B select the asynchronous carrier signal, and asynchronous PWM control for generating switching pulses using the common asynchronous carrier signal for both of the first group and the second group is performed. Voltage command calculations are performed in synchronization with the timings of tops and bottoms of the bottom asynchronous carrier signal. Therefore, the calculation times are constant, and it is possible to stably perform voltage command calculation, including calculation for the inter-group interference prevention processing.

In the case where the rotation speed is middle and the operation state is in a middle-speed region, 9-pulse synchronous PWM control or 6-pulse synchronous PWM control is performed. The control mode is set to the "first synchronous PWM control mode". When the number of pulses is large, the interval between a top and a bottom or a top and a top of a synchronous carrier signal is shortened. Therefore, the first selector 138A and the second selector 138B select the first synchronous carrier signal in common, and synchronous PWM control for generating switching pulses using the same synchronous carrier signal is performed. Thus, variation in voltage command calculation time is suppressed, and voltage command calculation can be accurately performed.

In the case where the rotation speed is further increased and the operation state is in a high-speed region, 3-pulse synchronous PWM control is performed, and the control mode is set to the "second synchronous PWM control mode". The first selector 138A and the second selector 138B select the first synchronous carrier signal and the second synchronous carrier signal, respectively. In this case, the first carrier signal C1 is synchronized with the first group voltage command, and the second carrier signal C2 is synchronized with the second group voltage command. Thus, synchronous carrier signals independent of each other are used for generation of switching pulses for the first group and the second group.

As described above, if it is determined that the rotation speed is lower than a predetermined speed and the operation state is in a low-speed region, the asynchronous PWM control mode is selected, and if it is determined that the rotation speed is higher than the predetermined speed and the operation state is in a middle-speed or high-speed region, the first synchronous PWM control mode or the second synchronous PWM control mode is selected.

In this example, the control mode is switched on the basis of the rotation speed. However, the above is applicable also in the case of switching the control mode on the basis of the modulation factor or the frequency of the voltage commands.

In 9-pulse synchronous PWM control in the low-speed region and the middle-speed region, current control by PI control shown in Expression (3) to Expression (5) is performed, but in 6-pulse synchronous PWM control in the middle-speed region, and in the high-speed region, driving and control of the multiplex-winding electric motor 83 may be performed by directly inputting the voltage commands without performing the current control. In this case, the voltage command inputted directly is compared with the carrier signal, to generate switching pulses. In addition, in the case where the current control is not performed, the voltage command does not vary sharply, and the interval between a top and a bottom of the synchronous carrier signal does not greatly vary. Therefore, it is possible to stably perform calculations for coordinate conversion and the like.

According to embodiment 1, the time for calculating the voltage commands for driving the multiplex-winding electric motor is ensured and the multiplex-winding electric motor can be stably controlled. More specifically, as carrier signals for generating switching pulses for driving switching elements of the power converter, the first synchronous carrier signal synchronized with the first group voltage command, the second synchronous carrier signal synchronized with the second group voltage command, and the asynchronous carrier signal are generated, and carrier signals of types corresponding to the operation state of the multiplex-winding electric motor are selectively outputted as the first carrier signal and the second carrier signal. In this way, in the low-speed region in which asynchronous PWM control is to be performed, switching pulses for the first group and the second group are generated using the common asynchronous carrier signal for the first group and the second group, and in the middle-speed region in which there is a possibility that the voltage command calculation time becomes insufficient when the inter-group interference prevention processing is performed in synchronous PWM control, switching pulses for the first group and the second group are generated using the common synchronous carrier signal for the first group and the second group, whereby variation in the voltage command calculation time is suppressed, thus enabling voltage command calculation to be accurately performed. In the high-speed region in which the cycle of the synchronous carrier signal for each group is long and there is no possibility that the voltage command calculation time becomes insufficient, switching pulses for the respective groups are generated using independent synchronous carrier signals for the respective groups. Thus, in all the operation states in the low-speed region, the middle-speed region, and the high-speed region, the voltage command calculation time is ensured and the multiplex-winding electric motor can be stably controlled.

Embodiment 2

Figure 13:
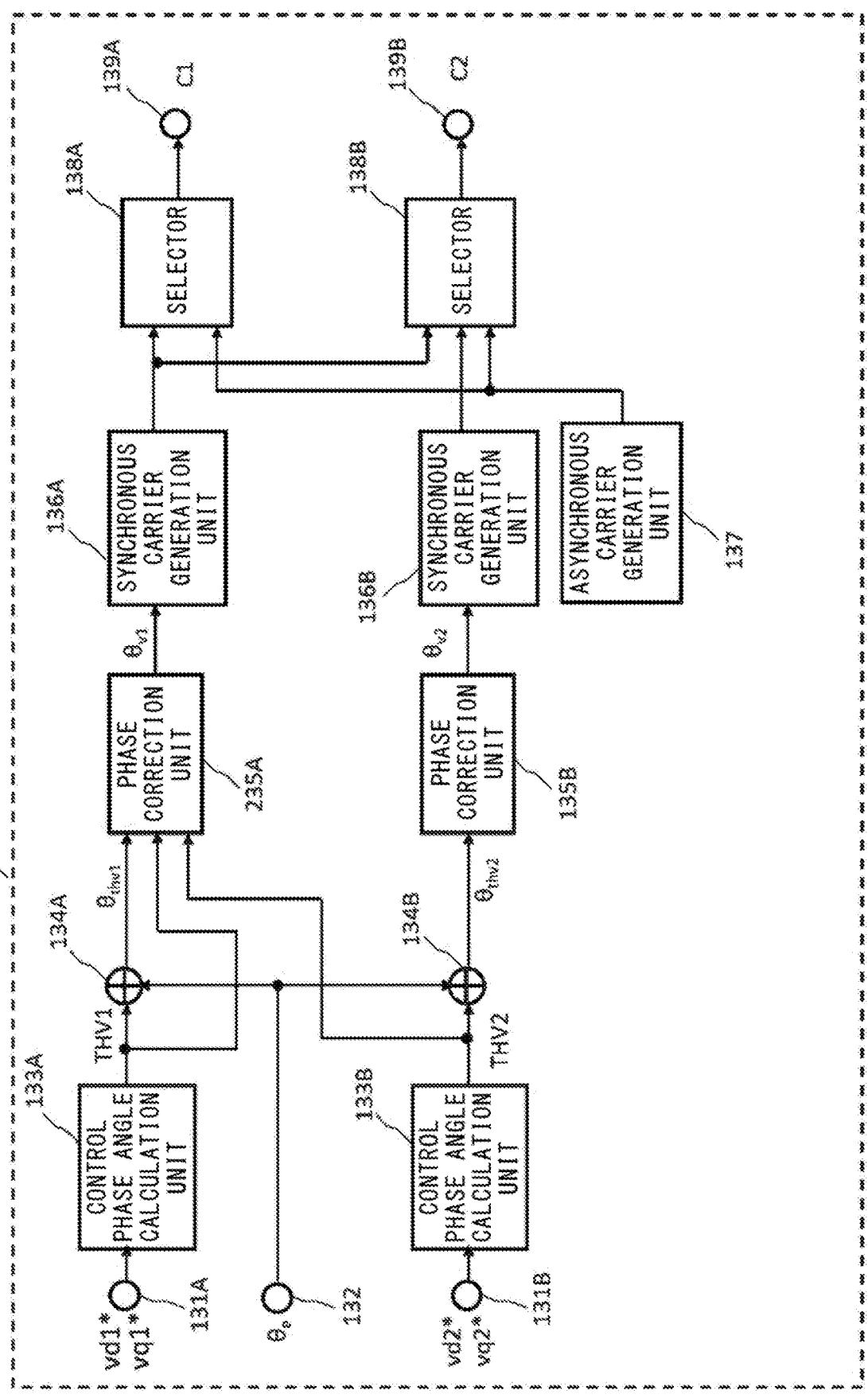
FIG. 13 is a detailed block diagram showing the configuration of a carrier generation unit according to embodiment 2 of the present invention.

Hereinafter, embodiment 2 of the present invention will be described with reference to FIG. 13. In embodiment 2, the common synchronous carrier signal to be used for synchronous PWM control is generated by being calculated on the basis of the voltage commands for both winding groups, unlike embodiment 1. FIG. 13 is a detailed block diagram showing the configuration of a carrier generation unit according to embodiment 2. The same or corresponding parts as those in FIG. 3 are denoted by the same reference characters. In the following description, parts different from FIG. 3 are mainly described. In a carrier generation unit 23, a first phase correction unit 235A is a phase correction circuit which calculates a first voltage phase $\theta v1$ using an output $\theta thv1$ of the first adder 134A, a first control phase angle THV1 outputted from the first control phase angle calculation unit 133A, and a second control phase angle THV2 outputted from the second control phase angle calculation unit 133B, and outputs the first voltage phase $\theta v1$. The other parts are the same as in embodiment 1, and therefore the description thereof is omitted.

Next, operation will be described. In the first phase correction unit 235A, a voltage phase correction amount $\Delta\theta$ is calculated from the difference between the first control phase angle THV1 and the second control phase angle THV2, and the output $\theta thv1$ of the first adder 134A is corrected by the voltage phase correction amount $\Delta\theta$, whereby the first voltage phase $\theta v1$ is calculated. Specifically, in calculation of the voltage phase for generating the synchronous carrier signal to be used in synchronous PWM control for the first group and the second group in common, phase correction is performed, in addition to using the electric phase difference between the winding group of the first group and the winding group of the second group, on the basis of the voltage phase correction amount $\Delta\theta$ which is the phase difference between the first group voltage command and the second group voltage command, e.g., using $\Delta\theta/2$ as a phase correction amount.

In addition, also in the case of performing synchronous PWM control independently for each of the first group and the second group by selecting the first synchronous carrier signal as the first carrier signal C1 and selecting the second synchronous carrier signal as the second carrier signal C2, it is possible to perform correction on the basis of the voltage phase correction amount $\Delta\theta$ in calculation of the first voltage phase $\theta v1$. In this case, limit processing using a maximum correction amount $\Delta\theta$ max may be performed so that the first voltage phase $\theta v1$ does not differ by a certain value or greater from the second voltage phase $\theta v2$. That is, if the voltage phase correction amount $\Delta\theta$ is equal to or smaller than the maximum correction amount $\Delta\theta$max, correction is performed using the voltage phase correction amount $\Delta\theta$, and if the voltage phase correction amount $\Delta\theta$ is greater than the maximum correction amount $\Delta\theta$max, correction is performed using the maximum correction amount $\Delta\theta$max. In the case where the first voltage phase $\theta v1$ calculated under the above limit processing is used, the relative phase relationship between the first carrier signal C1 and the second carrier signal C2 is kept within a certain value, and thus the calculation time for performing current control in synchronous PWM control is stably ensured. It is noted that the same effect can be obtained even in the case where the phase correction based on the voltage phase correction amount $\Delta\theta$ as described above is performed in calculation of the second voltage phase $\theta v2$.

The other matters are the same as in embodiment 1 and therefore the description thereof is omitted.

In embodiment 2, the same effect as in embodiment 1 can be obtained.

In addition, the first voltage phase or the second voltage phase is calculated using a phase correction amount based on the difference between the first control phase angle and the second control phase angle. Therefore, the relative phase relationship between the first synchronous carrier signal and the second synchronous carrier signal can be kept and thus the plurality of power converters for supplying AC power to the multiplex-winding electric motor can be stably controlled.

Embodiment 3

Figure 14:
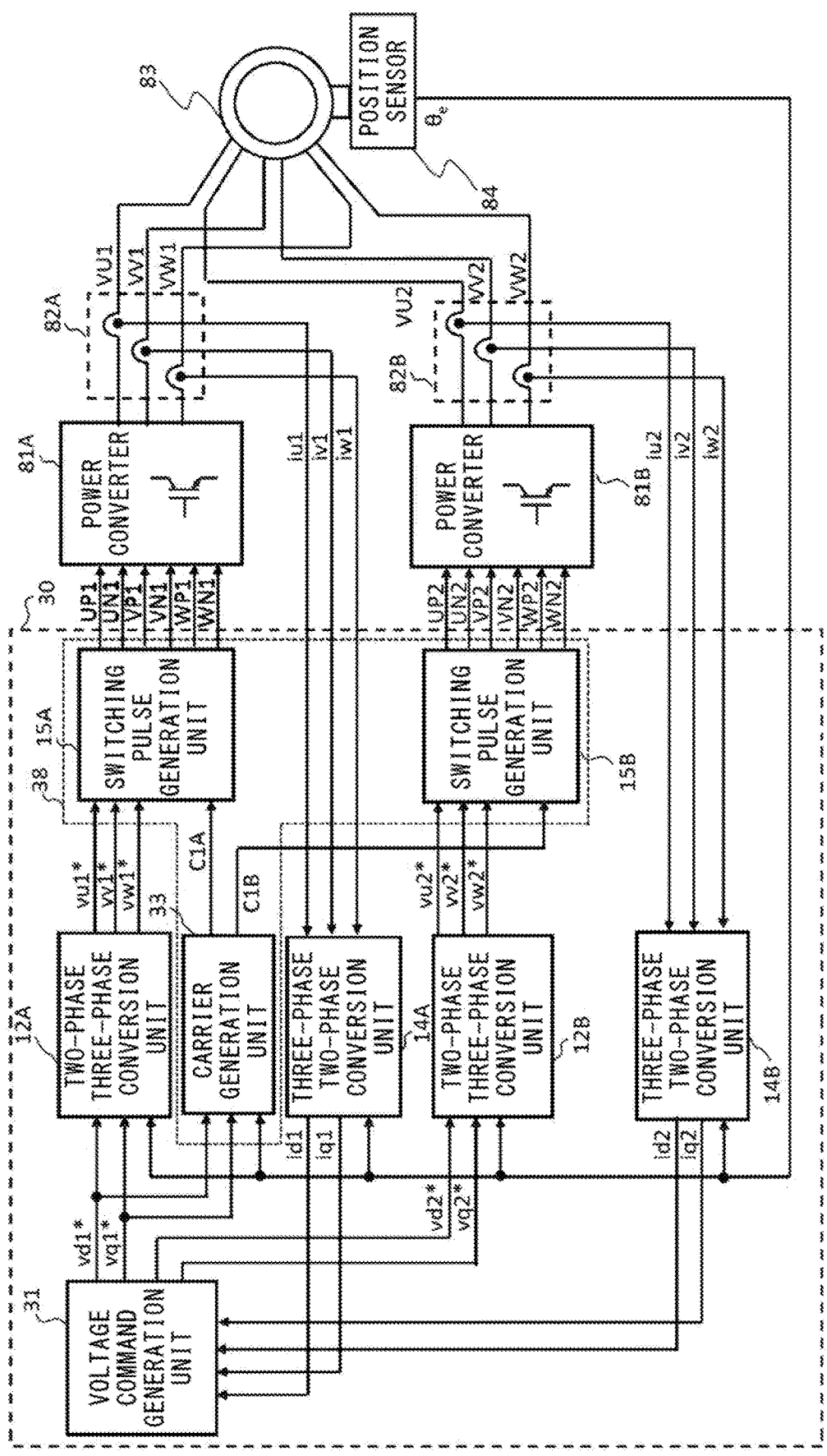
FIG. 14 is a block diagram showing the configuration of a power converter control device according to embodiment 3 of the present invention.

Hereinafter, embodiment 3 of the present invention will be described with reference to FIG. 14 to FIG. 19. In embodiment 3, the second synchronous carrier signal is generated on the basis of the first voltage phase so that the second carrier signal is also synchronized with the first voltage phase in synchronous PWM control. FIG. 14 is a block diagram showing the configuration of a power converter control device according to embodiment 3. The same or corresponding parts in FIG. 1 are denoted by the same reference characters. In the following description, parts different from FIG. 1 will be mainly described. A power converter control device 30 is different from embodiment 1 in a carrier generation unit 33. The carrier generation unit 33 receives the first group voltage commands vd1*, vq1* from a voltage command generation unit 31, and the magnetic pole position signal ee from the position sensor 84, and outputs a first carrier signal C1A to the first switching pulse generation unit 15A, and a second carrier signal C1B to the second switching pulse generation unit 15B. The carrier generation unit 33, the first switching pulse generation unit 15A, and the second switching pulse generation unit 15B form a PWM control unit 38. The PWM control unit 38 corresponds to the PWM control unit 18 in embodiment 1.

Figure 15:
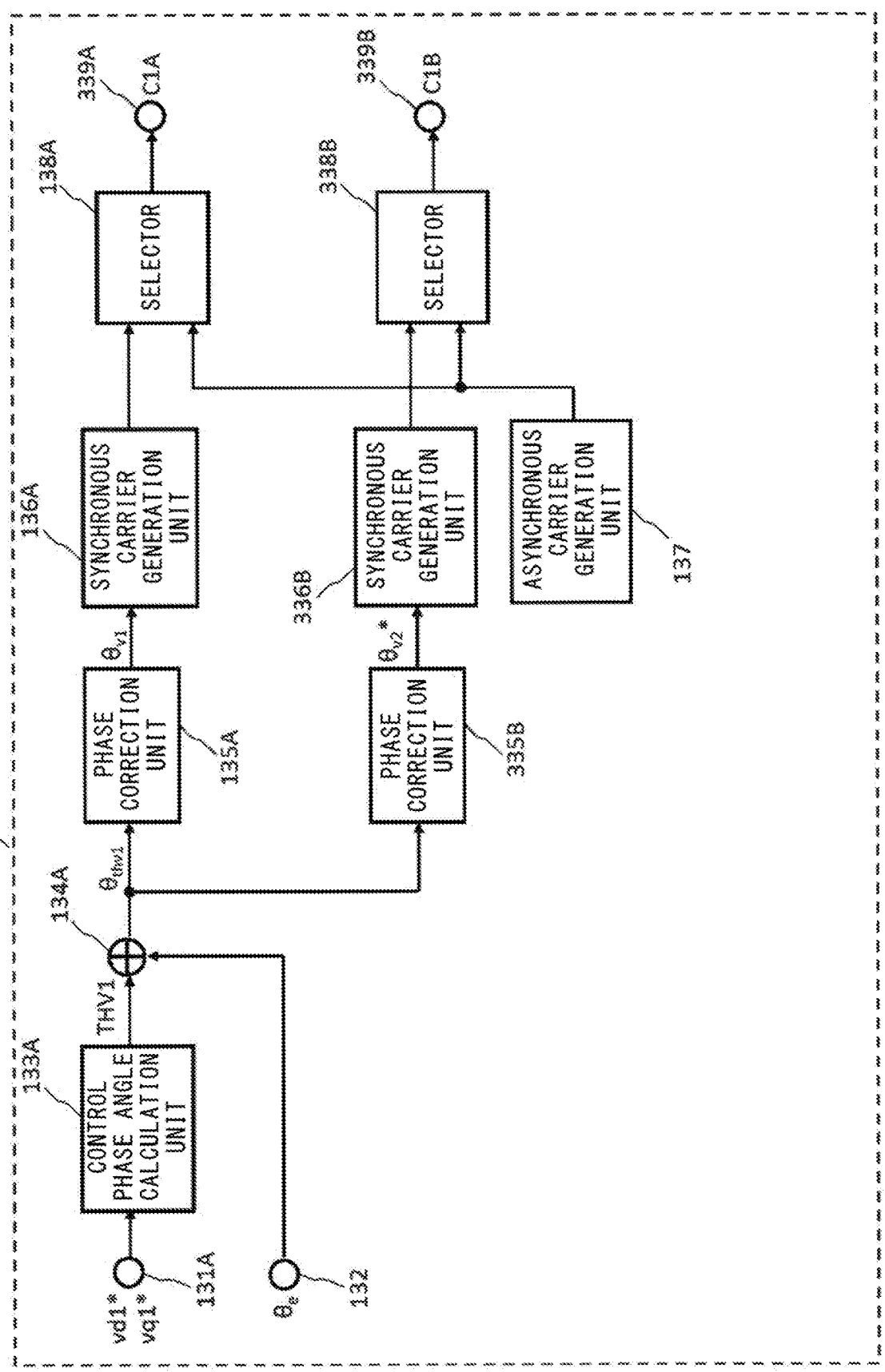
FIG. 15 is a detailed block diagram showing the configuration of a carrier generation unit according to embodiment 3 of the present invention.

FIG. 15 is a detailed block diagram showing the configuration of the carrier generation unit according to embodiment 3. The same or corresponding parts as those in FIG. 3 are denoted by the same reference characters. In the following description, parts different from FIG. 3 will be mainly described. In the carrier generation unit 33, a second phase correction unit 335B calculates a second voltage phase θv2* from the first group voltage commands vd1*, vq1* and the magnetic pole position signal ee, and outputs the second voltage phase θv2* to a second synchronous carrier generation unit 336B. The second synchronous carrier generation unit 336B generates a second synchronous carrier signal using the second voltage phase θv2*.

If the first group voltage commands vd1*, vq1* and the second group voltage commands vd2*, vq2* are equal to each other, the first control phase angle THV1 and the second control phase angle THV2 are the same angle. Therefore, under the assumption that the voltage commands for the first group and the second group are not greatly different from each other, the second voltage phase θv2* is calculated through calculation of the following Expression (13) using the electric-angle phase difference θoffset between the winding group of the first group and the winding group of the second group.

[Mathematical 13]

$$\theta v2^* = THV2 + \theta e - \frac{\pi}{2} + \theta \text{offset} \quad (13)$$

The second synchronous carrier generation unit 336B generates a second synchronous carrier signal using the second voltage phase θv2* calculated as shown by Expression (13), and outputs the second synchronous carrier signal to the second selector 138B. In this case, the phase of the second synchronous carrier signal becomes a phase obtained by correcting the first control phase angle THV1 by a phase correction amount determined on the basis of the electric-angle phase difference θoffset between the winding group of the first group and the winding group of the second group.

The first selector 138A selects one of the first synchronous carrier signal received from the first synchronous carrier generation unit 136A and the asynchronous carrier signal received from the asynchronous carrier generation unit 137, and outputs the selected carrier signal as the first carrier signal C1A. The first carrier signal C1A is outputted to the first switching pulse generation unit 15A via a first output terminal 339A. The second selector 338B selects one of the second synchronous carrier signal received from the second synchronous carrier generation unit 336B and the asynchronous carrier signal received from the asynchronous carrier generation unit 137, and outputs the selected carrier signal as the second carrier signal C1B. The second carrier signal C1B is outputted to the second switching pulse generation unit 15B via a second output terminal 339B.

Figure 16:
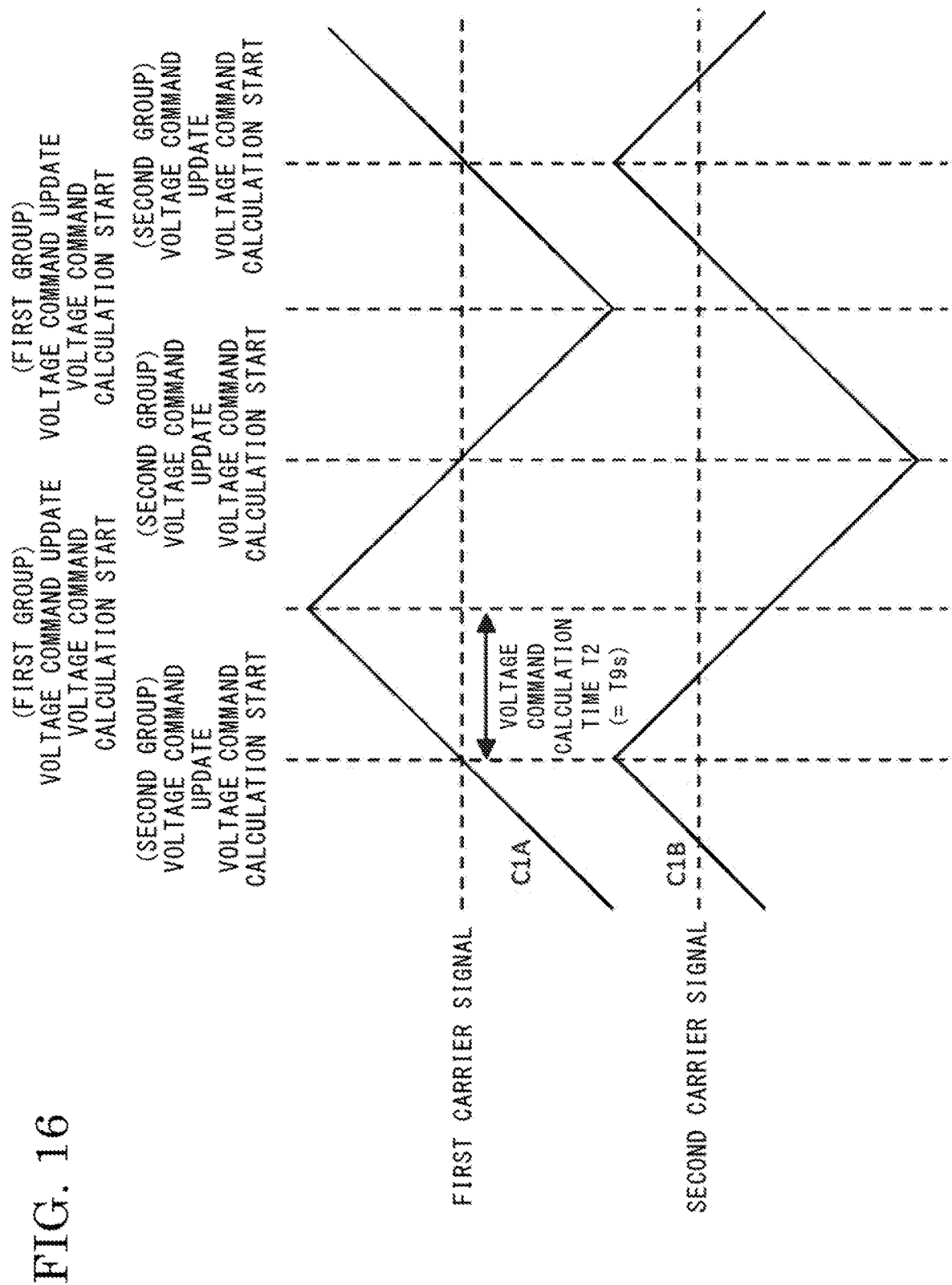
FIG. 16 shows calculation timings in the case of performing voltage command calculation between tops and bottoms of carrier signals for both winding groups in synchronous PWM control, according to embodiment 3 of the present invention.

FIG. 16 shows processing timings in the case of performing voltage command calculation between tops and bottoms of the carrier signals for both winding groups in synchronous PWM control in embodiment 3, and shows the synchronous carrier signals for the first group and the second group which are outputted from the carrier generation unit 33 in 9-pulse synchronous PWM control. The first carrier signal C1A is generated so as to be synchronized with the first voltage phase θv1. The second carrier signal C1B is generated so as to be synchronized with the second voltage phase θv2* and imparted with a certain phase difference θoffset relative to the first voltage phase θv1. In voltage command calculation, as in embodiment 1, for the first group voltage command, start of voltage command calculation and voltage command update are performed in synchronization with the timings of tops and bottoms of the first carrier signal C1A, and for the second group voltage command, start of voltage command calculation and voltage command update are performed in synchronization with the timings of tops and bottoms of the second carrier signal C1B. In actuality, the second carrier signal C1B is synchronized with the first voltage phase θv1 as shown in Expression (13). Therefore, the voltage command calculation time T2 becomes almost constant at ¼ of one cycle of the first-group synchronous carrier signal, and thus a stable calculation time can be ensured.

In FIG. 16, the case of 9-pulse synchronous PWM control has been shown. However, the same applies for the carrier signals in 3-pulse synchronous PWM control.

Figure 17:
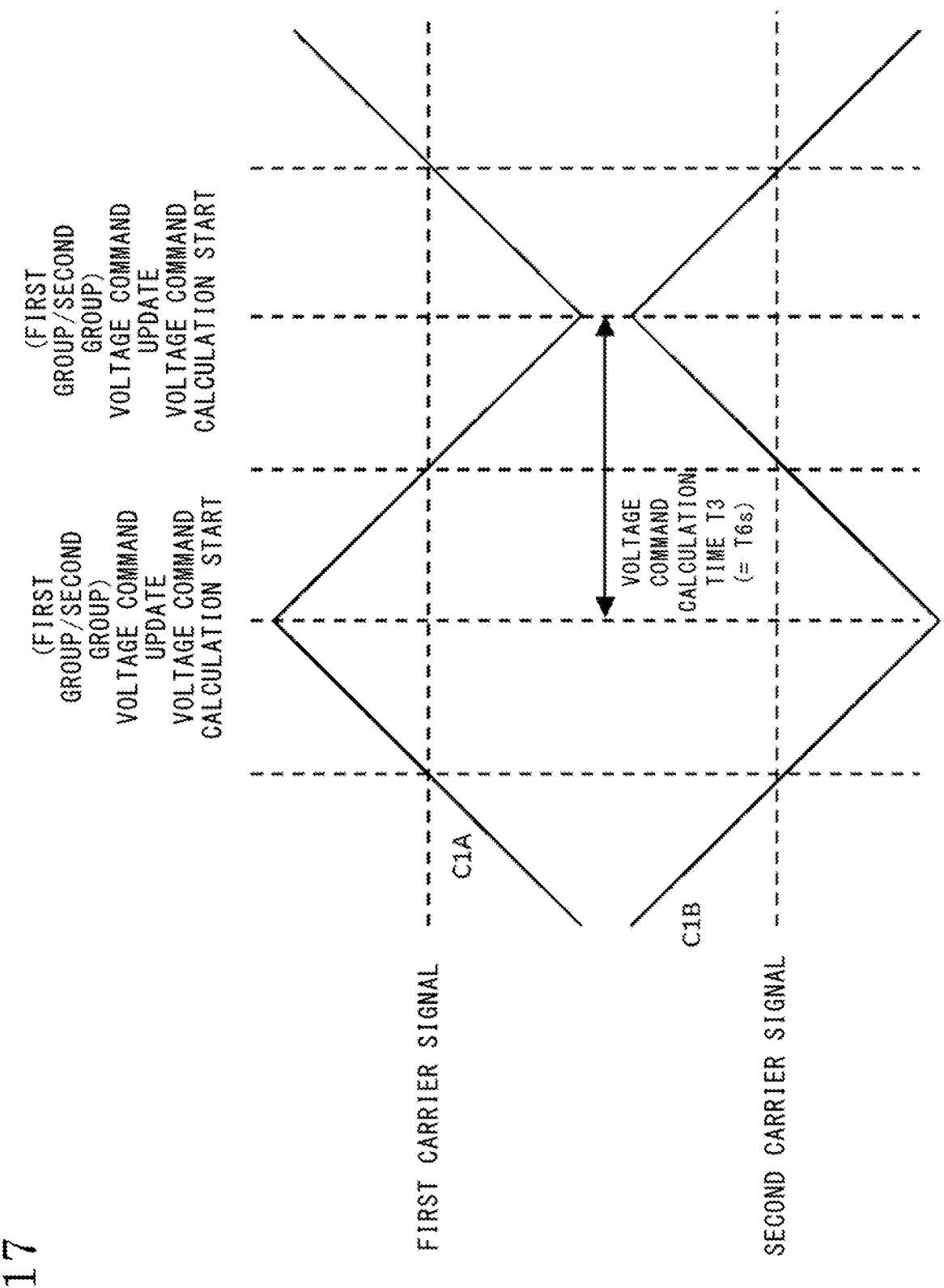
FIG. 17 shows calculation timings in the case of performing voltage command calculation between tops of carrier signals for both winding groups in synchronous PWM control, according to embodiment 3 of the present invention.

FIG. 17 shows processing timings in the case of performing voltage command calculation between tops and bottoms of the carrier signals for both winding groups in synchronous PWM control in embodiment 3, and shows the synchronous carrier signals for the first group and the second group which are outputted from the carrier generation unit 33 in 6-pulse synchronous PWM control. The first carrier signal C1A is generated so as to be synchronized with the first voltage phase θv1. The second carrier signal C1B is generated so as to be synchronized with the second voltage phase θv2* and imparted with a certain phase difference θoffset relative to the first voltage phase θv1. In voltage command calculation, as in embodiment 1, for the first group voltage command, start of voltage command calculation and voltage command update are performed in synchronization with the timings of tops and bottoms of the first carrier signal C1A, and for the second group voltage command, start of voltage command calculation and voltage command update are performed in synchronization with the timings of tops and bottoms of the second carrier signal C1B. In the example shown in FIG. 17, the carrier phase difference between the first carrier signal C1A and the second carrier signal C1B is 180°, and a top (bottom) of the first carrier signal C1A and a bottom (top) of the second carrier signal C1B arrive at the same time. Therefore, start of voltage command calculation and voltage command update are performed for the first group and the second group at the same time. In addition, since the second carrier signal C1B is synchronized with the first voltage phase θv1, the voltage command calculation time T3 becomes almost constant at ½ of one cycle of the first-group synchronous carrier signal.

FIG. 18 shows the relationship between the operation state of the multiplex-winding electric motor and the type of the carrier signal used in PWM control in embodiment 3. Determination of the operation state of the multiplex-winding electric motor 83 is the same as in embodiment 1.

In the case where the rotation speed is low and the operation state is in a low-speed region, as in embodiment 1, the control mode is set to the "asynchronous PWM control mode", and asynchronous PWM control for generating switching pulses using the common asynchronous carrier for the first group and the second group is performed. In this case, the voltage command calculation time is constant, and it is possible to stably perform voltage command calculation, including calculation for the inter-group interference prevention processing.

In the case where the rotation speed is middle and the operation state is in a middle-speed region, as in embodiment 1, 9-pulse synchronous PWM control or 6-pulse synchronous PWM control is performed and the control mode is set to the "first synchronous PWM control mode". In this regard, embodiment 3 is different from embodiment 1 in that the respective carrier signals (first carrier signal C1A and second carrier signal C1B) for the first group and the second group are used. However, the first carrier signal C1A and the second carrier signal C1B are both synchronized with the first voltage phase. In addition, the first carrier signal C1A and the second carrier signal C1B are synchronized with the first voltage phase with a certain phase difference θoffset imparted therebetween. Therefore, a calculation time is ensured including calculation for the inter-group interference prevention processing, and thus stable current control can be performed. It is noted that control in which the voltage command is directly inputted as a command value from outside is also possible.

In the case where the rotation speed is further increased and the operation state is in a high-speed region, 3-pulse synchronous PWM control is performed and the control mode is set to the "second synchronous PWM control mode". As in embodiment 1, the respective carrier signals for the first group and the second group are used in 3-pulse PWM control, but unlike embodiment 1, the two carrier signals are not independent of each other and, with a certain phase difference θoffset imparted to the carrier signal for the second group, the two carrier signals are synchronized with the first group voltage command in common.

Figure 19:
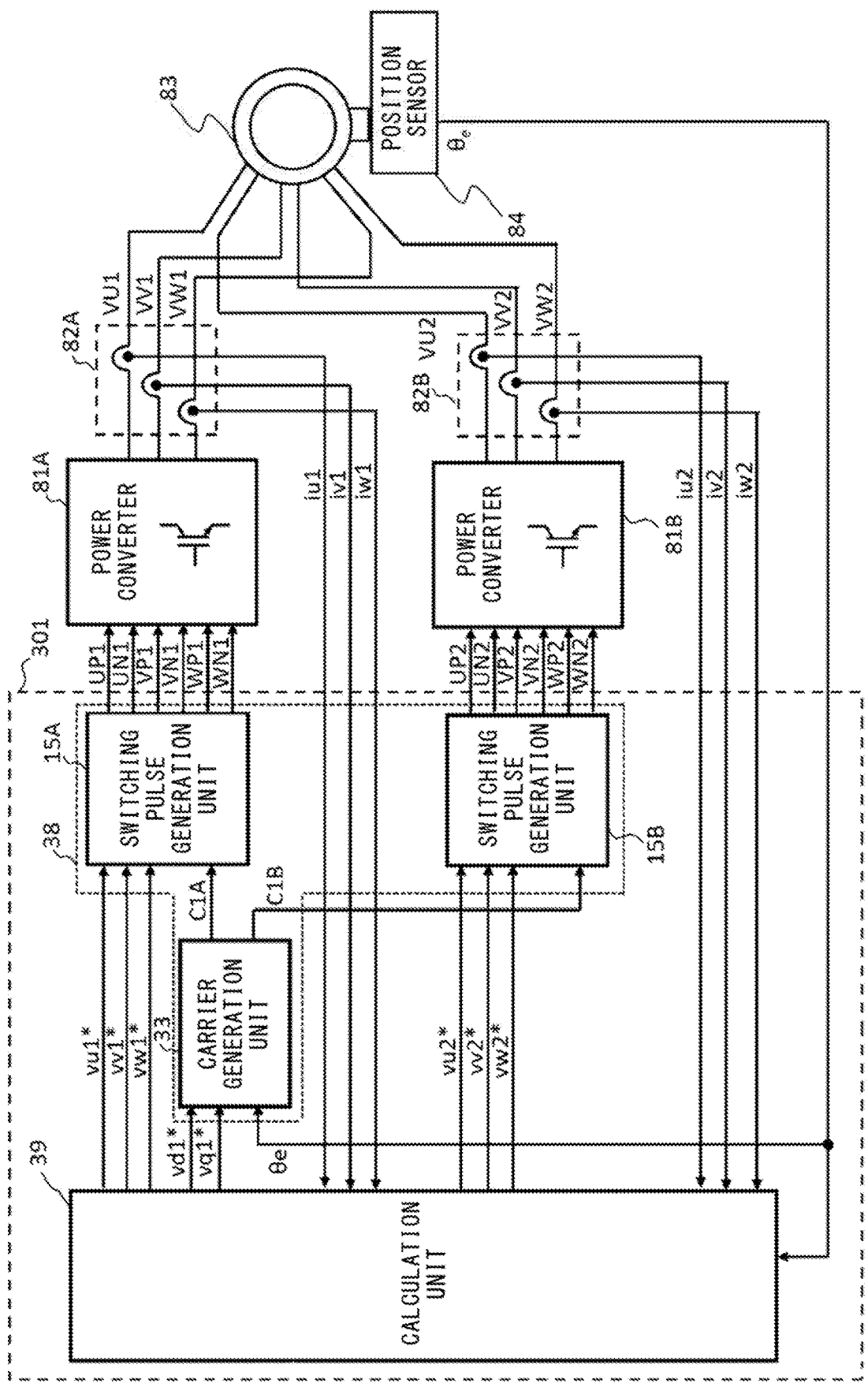
FIG. 19 is a block diagram showing the configuration of a power converter control device in another example of embodiment 3 of the present invention.

FIG. 19 is a block diagram showing the configuration of a power converter control device in another example of embodiment 3, in which the power converter control device according to embodiment 3 is implemented using a calculation unit of a microcomputer. In FIG. 19, the same or corresponding parts as those in FIG. 1 and FIG. 14 are denoted by the same reference characters. In the following description, parts different from FIG. 1 and FIG. 14 will be mainly described. A power converter control device 301 is different from the power converter control device 30 in that the voltage command generation unit 11, the first two-phase three-phase conversion unit 12A, the second two-phase three-phase conversion unit 12B, the first three-phase two-phase conversion unit 14A, and the second three-phase two-phase conversion unit 14B in FIG. 1 and FIG. 14 are collectively replaced with a calculation unit 39 formed from a microcomputer. Hereinafter, this part will be mainly described.

On the basis of the first group current commands id1*, iq1*(not shown) and the second group current commands id2*, iq2*(not shown) inputted from the superior control device (not shown), and the first group three-phase current values iu1, iv1, iw1, the second group three-phase current values iu2, iv2, iw2, and the magnetic pole position signal ee that are detected, the calculation unit 39 performs the same calculation as in embodiment 1, and outputs the first group three-phase voltage commands vu1*, vv1*, vw1*, the second group three-phase voltage commands vu2*, vv2*, vw2*, and the first group voltage commands vd1*, vq1* represented in an orthogonal two-phase coordinate system. The carrier generation unit 33 receives the first group voltage commands vd1*, vq1*, and generates the first carrier signal C1A and the second carrier signal C1B to be respectively used for generating switching pulses in the first switching pulse generation unit 15A and the second switching pulse generation unit 15B. As in embodiment 1, the first switching pulse generation unit 15A and the second switching pulse generation unit 15B generate the first group switching pulses UP1, UN1, VP1, VN1, WP1, WN1 and the second group switching pulses UP2, UN2, VP2, VN2, WP2, WN2 through triangle wave comparison, and outputs them to the first power converter 81A and the second power converter 81B. As in embodiment 3, the carrier generation unit 33 outputs the first carrier signal C1A to the first switching pulse generation unit 15A, and the second carrier signal C1B to the second switching pulse generation unit 15B.

The other matters are the same as in embodiment 1, and therefore the description thereof is omitted.

The configuration using the calculation unit 39 as in the power converter control device 301 may be applied to embodiment 1 or embodiment 2.

In embodiment 3, the same effect as in embodiment 1 can be obtained.

The carrier generation unit is configured so that the second synchronous carrier signal is synchronized with the first group voltage command. Therefore, the second group voltage command does not need to be inputted to the carrier generation unit, and the configuration of the carrier generation unit is simplified.

In addition, if a voltage command unit and the like are replaced with the calculation unit formed from a microcomputer, several function units can be integrated, and therefore the power converter control device can be configured at low cost.

Embodiment 4

Figure 20:
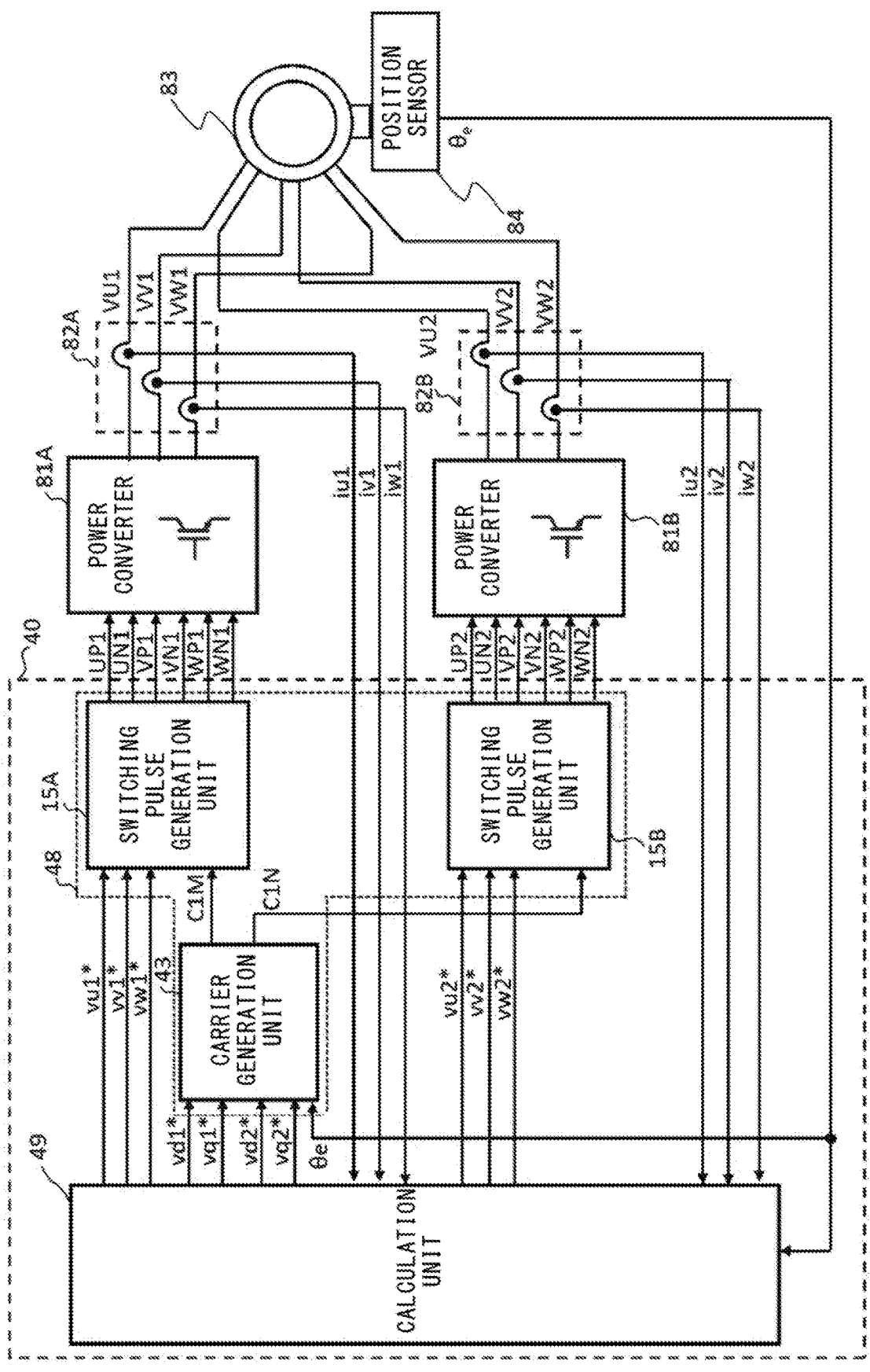
FIG. 20 is a block diagram showing the configuration of a power converter control device according to embodiment 4 of the present invention.

Hereinafter, embodiment 4 of the present invention will be described with reference to FIG. 20 to FIG. 22. Embodiment 4 is different from embodiment 3 in that, in generation of the synchronous carrier signals for synchronous PWM control, the second synchronous carrier signal is generated using the voltage phases of both of the first group and the second group. FIG. 20 is a block diagram showing the configuration of a power converter control device according to embodiment 4. The same or corresponding parts as those in FIG. 19 are denoted by the same reference characters. In the following description, parts different from FIG. 19 will be mainly described. A power converter control device 40 is different from embodiment 3 in a calculation unit 49 and a carrier generation unit 43.

On the basis of the first group current commands id1*, iq1* and the second group current commands id2*, iq2* inputted from the superior control device (not shown), and the first group three-phase current values iu1, iv1, iw1, the second group three-phase current values iu2, iv2, iw2, and the magnetic pole position signal θe that are detected, the calculation unit 49 performs the same calculation as in embodiment 3, and outputs the first group three-phase voltage commands vu1*, vv1*, vw1*, the second group three-phase voltage commands vu2*, vv2*, vw2*, and the first group voltage commands vd1*, vq1* and the second group voltage commands vd2*, vq2* represented in an orthogonal two-phase coordinate system. The first group voltage commands vd1*, vq1* and the second group voltage commands vd2*, vq2* are inputted to the carrier generation unit 43. The carrier generation unit 43 outputs a first carrier signal C1M for the first switching pulse generation unit 15A and a second carrier signal C1N for the second switching pulse generation unit 15B, on the basis of the first group voltage commands vd1*, vq1* and the second group voltage commands vd2*, vq2* outputted from the calculation unit 49, and the magnetic pole position signal θe. As in embodiment 3, the first switching pulse generation unit 15A and the second switching pulse generation unit 15B generate switching pulses through triangle wave processing. The carrier generation unit 43, the first switching pulse generation unit 15A, and the second switching pulse generation unit 15B form a PWM control unit 48. The PWM control unit 48 corresponds to the PWM control unit 18 in embodiment 1.

Figure 21:
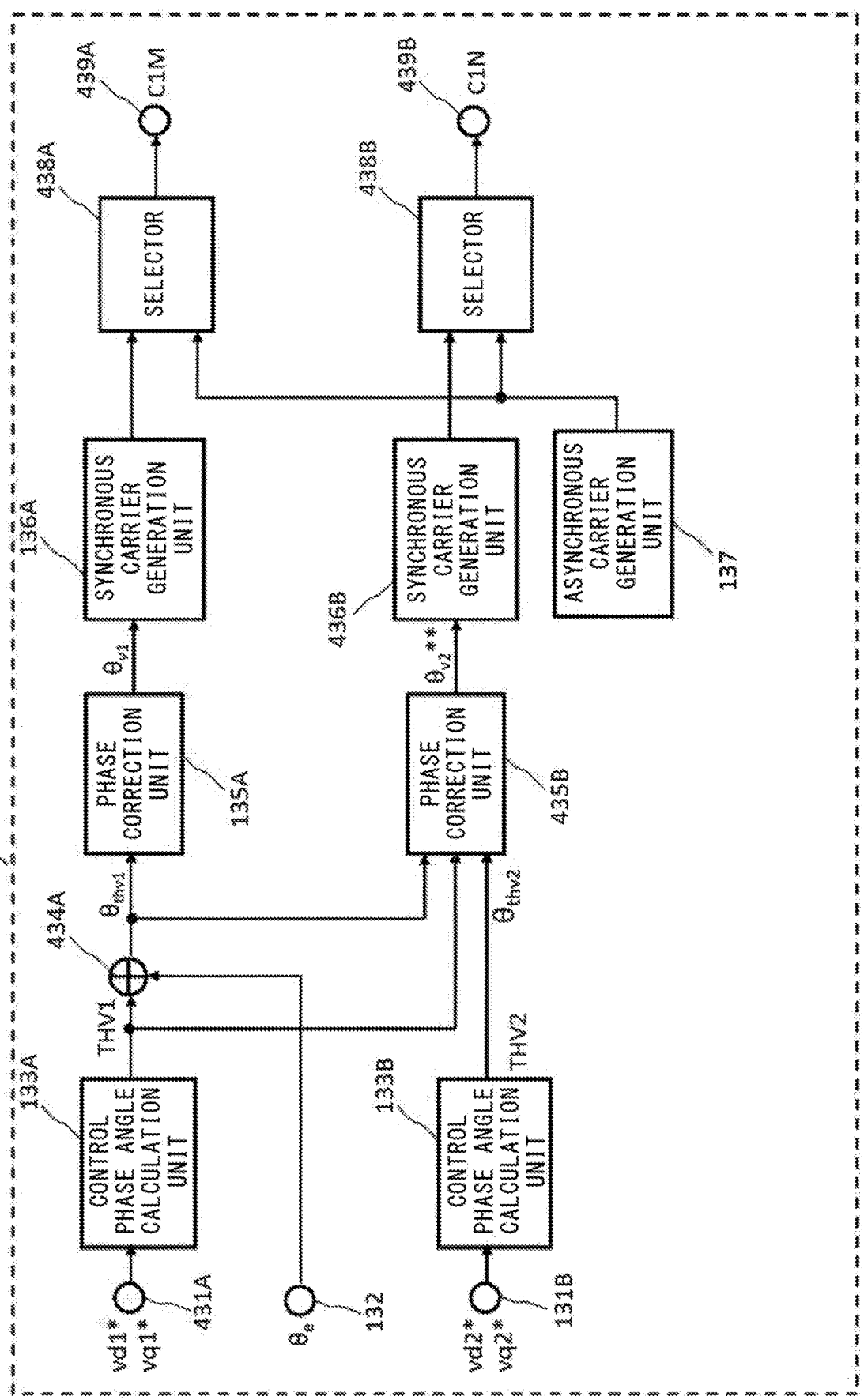
FIG. 21 is a detailed block diagram showing the configuration of a carrier generation unit according to embodiment 4 of the present invention.

FIG. 21 is a detailed block diagram showing the configuration of the carrier generation unit according to embodiment 4. The same or corresponding parts as those in the carrier generation unit shown in FIG. 3 are denoted by the same reference characters. In the following description, parts different from FIG. 3 will be mainly described. The difference from embodiment 3 is that the second synchronous carrier signal is generated from the first group voltage commands vd1*, vq1* and the second group voltage commands vd2*, vq2* represented in an orthogonal two-phase coordinate system and the magnetic pole position signal θe. In the carrier generation unit 43, a second phase correction unit 435B receives the output θthv1 of the first adder 434A, the first control phase angle THV1, and the second control phase angle THV2, and calculates a second voltage phase θv2** from the output θthv1 of the first adder 434A, the first control phase angle THV1, and the second control phase angle THV2. If the first group voltage commands vd1*, vq1* and the second group voltage commands vd2*, vq2* are different from each other, the first control phase angle THV1 and the second control phase angle THV2 are different from each other. Therefore, in embodiment 4, a voltage phase correction amount Δθ* is calculated from the difference between the first control phase angle THV1 and the second control phase angle THV2. Then, in calculation of the second voltage phase θv2** on the basis of the output θthv1 of the first adder 434A, correction by the voltage phase correction amount Δθ* is performed. In this case, the second voltage phase θv2** with which the second synchronous carrier signal is synchronized becomes a phase obtained by correcting the output θthv1 of the first adder 434A by the voltage phase correction amount Δθ* determined on the basis of the phase difference between the first control phase angle THV1 and the second control phase angle THV2.

In calculation of the second voltage phase θv2, limit processing as described in embodiment 2 may be performed so that the first voltage phase θv1 and the second voltage phase θv2 does not differ by a certain value or greater in an electric-angle phase. In this case, if the phase correction amount Δθ* is equal to or smaller than the maximum correction amount Δθ max*, correction is performed by the phase correction amount Δθ*, and if the voltage phase correction amount Δθ* is greater than the maximum correction amount Δθ max*, correction is performed by the maximum correction amount Δθmax.

A first selector 438A selects one of the first synchronous carrier signal received from the first synchronous carrier generation unit 136A and the asynchronous carrier signal received from the asynchronous carrier generation unit 137, and outputs the selected carrier signal as the first carrier signal C1M. The first carrier signal C1M is outputted to the first switching pulse generation unit 15A via a first output terminal 439A. A second selector 438B selects one of the second synchronous carrier signal received from the second synchronous carrier generation unit 436B and the asynchronous carrier signal received from the asynchronous carrier generation unit 137, and outputs the selected carrier signal as the second carrier signal C1N. The second carrier signal C1N is outputted to the second switching pulse generation unit 15B via a second output terminal 439B.

Figure 22:
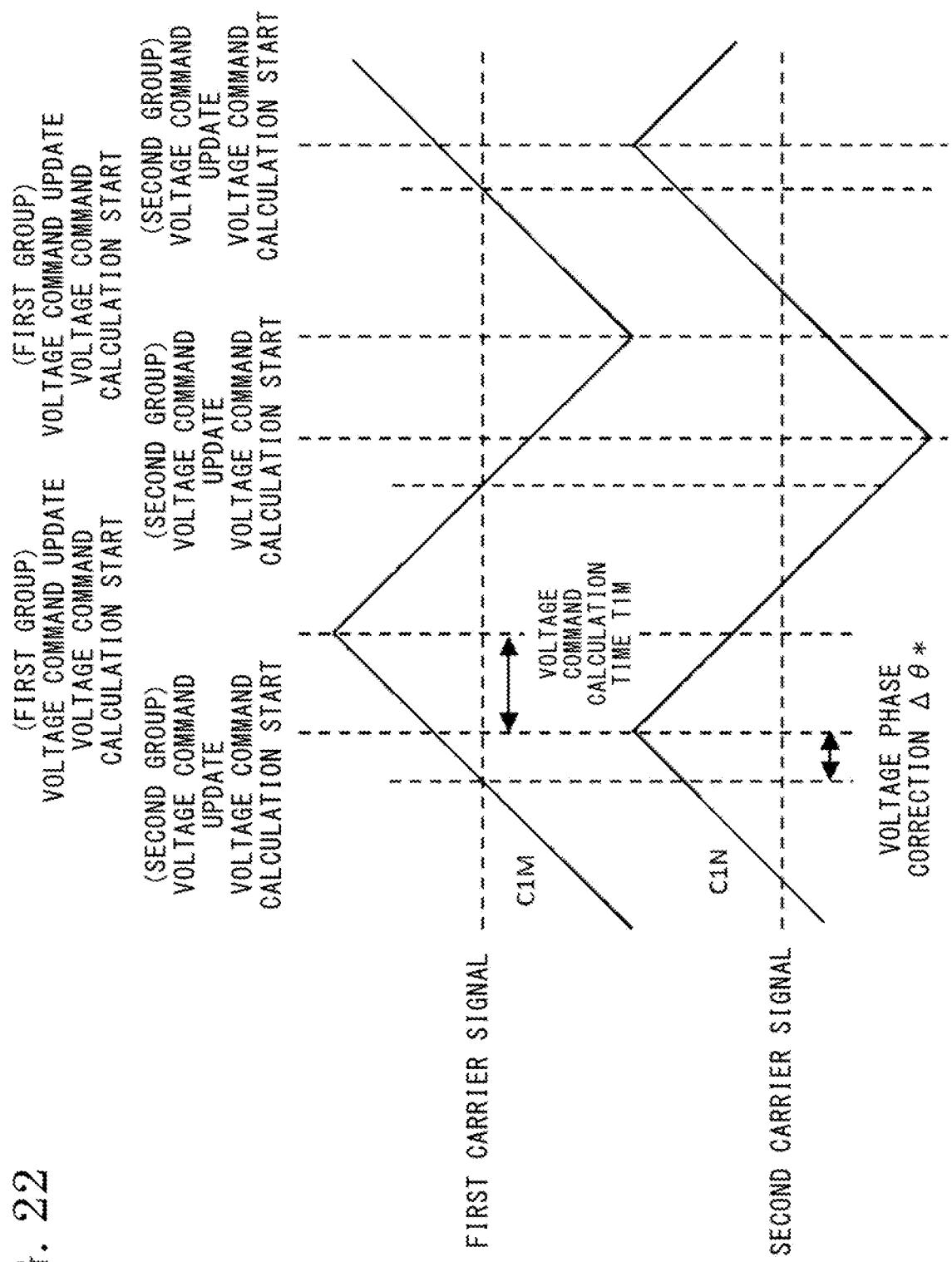
FIG. 22 shows calculation timings in the case of performing voltage command calculation between tops and bottoms of carrier signals for both winding groups in synchronous PWM control, according to embodiment 4 of the present invention.

FIG. 22 shows processing timings in the case of performing voltage command calculation between tops and bottoms of the carrier signals for both winding groups in synchronous PWM control in embodiment 4, and shows the synchronous carrier signals for the first group and the second group which are outputted from the carrier generation unit 43 in 9-pulse synchronous PWM control. The first carrier signal C1M is generated so as to be synchronized with the first voltage phase θv1. The second carrier signal C1N is generated so as to be synchronized with the second voltage phase θv2** and imparted with a certain phase difference relative to the first voltage phase θv1. In voltage command calculation, as in embodiment 1, for the first group voltage command, start of voltage command calculation and voltage command update are performed in synchronization with the timings of tops and bottoms of the first carrier signal C1M, and for the second group voltage command, start of voltage command calculation and voltage command update are performed in synchronization with the timings of tops and bottoms of the second carrier signal C1N. Here, since the voltage phase correction amount Δθ* is subjected to the limit processing by the maximum correction amount Δθ max, correction in calculation of the second voltage phase θv2** is performed within such a range as not to make the voltage command calculation time T1M insufficient.

In FIG. 22, the case of 9-pulse synchronous PWM control has been shown. However, the same applies for the carrier signals in 3-pulse synchronous PWM control.

The other matters are the same as in embodiment 1, and therefore the description thereof is omitted.

In embodiment 4, the same effect as in embodiment 1 can be obtained.

In calculation of the second voltage phase, correction by the voltage phase correction amount calculated from the difference between the first control phase angle and the second control phase angle is performed. Thus, it is possible to realize a power converter control device capable of controlling a multiplex-winding electric motor more stably.

Embodiment 5

Figure 23:
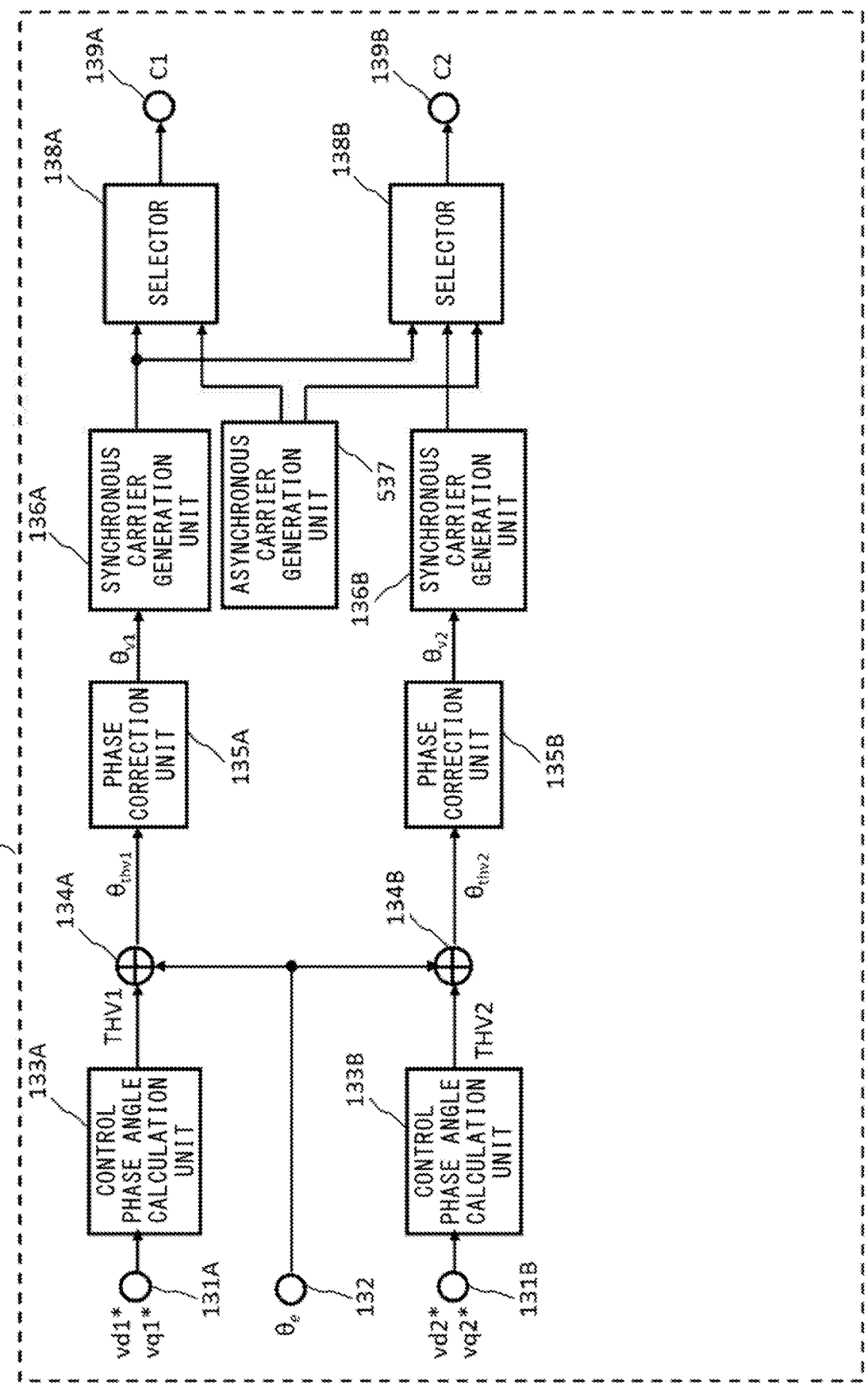
FIG. 23 is a detailed block diagram showing the configuration of a carrier generation unit according to embodiment 5 of the present invention.

Hereinafter, embodiment 5 of the present invention will be described with reference to FIG. 23 and FIG. 24. In embodiment 5, in the case of performing asynchronous PWM control in a low-speed region, different asynchronous carrier signals are respectively used in PWM control for the winding group of the first group and PWM control for the winding group of the second group, unlike embodiments 1 to 4. FIG. 23 is a detailed block diagram showing the configuration of a carrier generation unit according to embodiment 5. The same or corresponding parts as those in FIG. 3 are denoted by the same reference characters. In the following description, parts different from FIG. 3 will be mainly described. A carrier generation unit 53 includes an asynchronous carrier generation unit 537 which generates a first asynchronous carrier signal and a second asynchronous carrier signal and outputs the respective asynchronous carrier signals to the first selector 138A and the second selector 138B.

The first selector 138A selects one of the first synchronous carrier signal and the first asynchronous carrier signal, and outputs the selected carrier signal as the first carrier signal C1. The first carrier signal C1 is outputted to the first switching pulse generation unit 15A via the first output terminal 139A. The second selector 138B selects one of the first synchronous carrier signal, the second synchronous carrier signal, and the second asynchronous carrier signal, and outputs the selected carrier signal as the second carrier signal C2. The second carrier signal C2 is outputted to the second switching pulse generation unit 15B via the second output terminal 139B.

Figure 24:
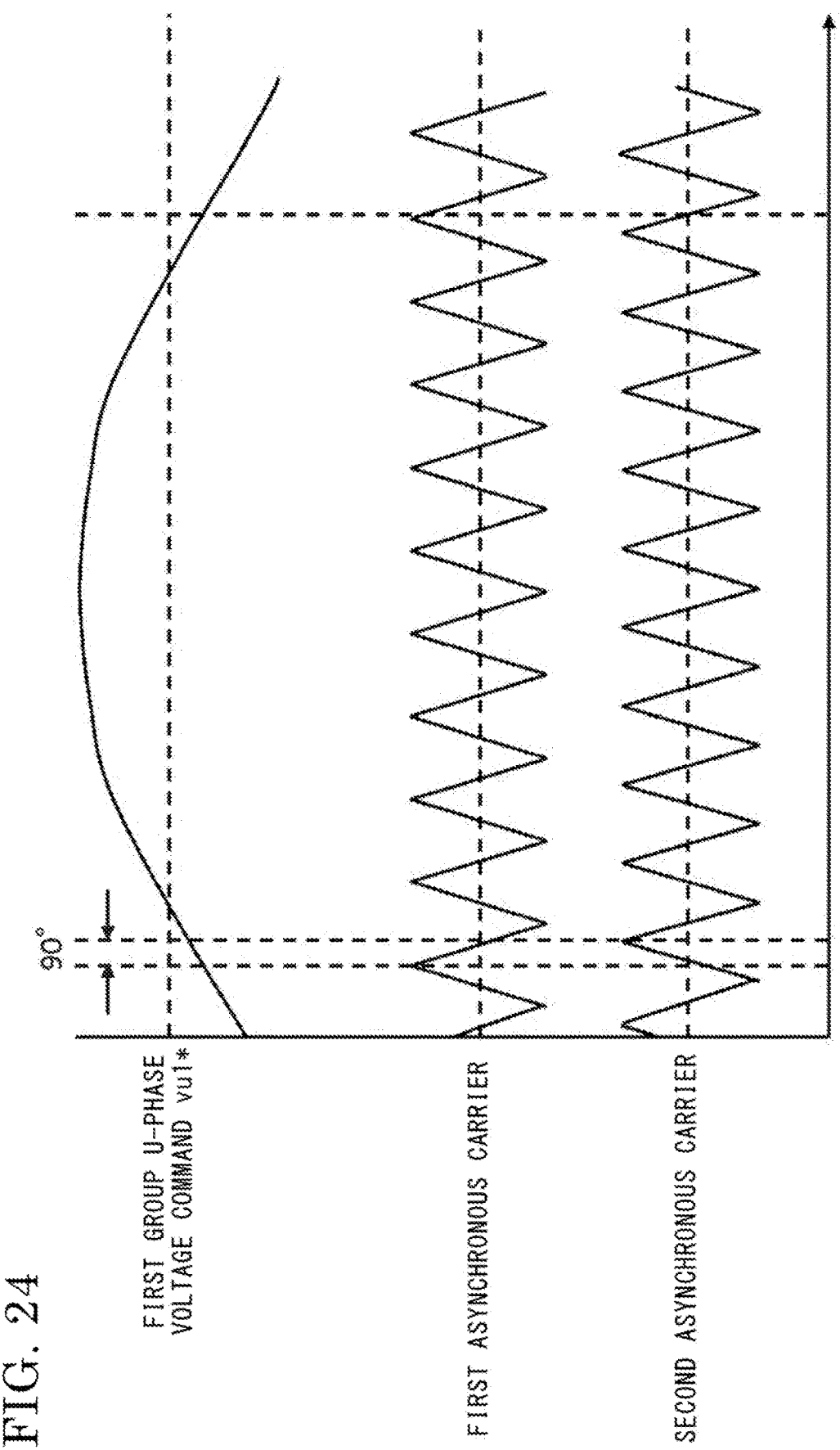
FIG. 24 is a timing chart showing the relationship among a voltage command for each winding group and asynchronous carrier signals, according to embodiment 5 of the present invention.

FIG. 24 is a timing chart showing the relationship among the voltage command for each winding group and the asynchronous carrier signals in embodiment 5. In FIG. 24, as an example, the first selector 138A and the second selector 138B respectively select the first asynchronous carrier signal and the second asynchronous carrier signal, so that the first asynchronous carrier signal is applied to PWM control for the first group, and the second asynchronous carrier signal is applied to PWM control for the second group. The first asynchronous carrier signal and the second asynchronous carrier signal have the same frequency and are different only in carrier phase. In the example shown in FIG. 24, the carrier phase difference is 90°. It is noted that the carrier phase difference imparted between the two asynchronous carrier signals is not limited to 90°, and may be 180° or the like.

The other matters are the same as in embodiment 1, and therefore the description thereof is omitted.

In embodiment 5, the same effect as in embodiment 1 can be obtained.

In addition, in asynchronous PWM control, the asynchronous carrier signals having the same frequency and different phases are used for the respective winding groups. Thus, harmonics occurring in currents flowing through the winding groups can be suppressed, whereby the multiplex-winding electric motor can be more stably controlled.

In the above embodiments, the case of driving a duplex three-phase AC electric motor duplexed using two winding groups has been shown as an example. However, the present invention is applicable to multi-group and multi-phase electric motors, and the number of phases and the number of groups are not particularly limited. In addition, the used multiplex-winding electric motor may be a permanent magnet synchronous electric motor or an induction electric motor.

Several methods for selecting carrier signals in PWM control are conceivable, and the way of combination is not limited to one combination. For example, it is also possible to perform control in which one carrier signal or two carrier signals having a phase difference are used in asynchronous PWM control and a carrier signal for synchronous PWM control is synchronized with a specific winding group such as the winding group of the second group. In addition, as the correction method for the carrier signals, there are several other methods such as calculation using an approximation formula and calculation by referring to a table, and thus the method is not limited to one method. In addition, the carrier signal is not limited to a triangle wave, and a saw-tooth-wave carrier signal may be used.

It is noted that, within the scope of the present invention, the above embodiments may be freely combined with each other. In addition, each of the above embodiments may be modified or simplified as appropriate.

DESCRIPTION OF THE REFERENCE CHARACTERS 10, 30, 301, 40 power converter control device
11, 31 voltage command generation unit
13, 23, 33, 43, 53 carrier generation unit
15A first switching pulse generation unit
15B second switching pulse generation unit
18, 38, 48 PWM control unit
81A first power converter
81B second power converter
83 multiplex-winding electric motor
131A first group voltage command input terminal
131B second group voltage command input terminal
132 magnetic pole position signal input terminal
133A first control phase angle calculation unit
133B second control phase angle calculation unit
135A, 235A first phase correction unit
135B, 335B, 435B second phase correction unit
136A first synchronous carrier generation unit
136B, 336B, 436B second synchronous carrier generation unit
137, 537 asynchronous carrier generation unit
138A, 438A first selector
138B, 338B, 438B second selector
C1, C1A, C1M first carrier signal
C2, C1B, C1N second carrier signal
θe magnetic pole position signal

The invention claimed is:

1. A power converter control device for performing PWM control for power converters which respectively supply power to a plurality of winding groups of a multiplex-winding electric motor including the plurality of winding groups, the power converter control device comprising:
a PWM controller configured to perform the PWM control while switching between an asynchronous PWM control mode using a carrier for the PWM control that is not synchronized with three-phase voltage commands for driving the multiplex-winding electric motor, and a synchronous PWM control mode using a carrier for the PWM control that is synchronized with the three-phase voltage commands for driving the multiplex-winding electric motor, wherein
the synchronous PWM control mode includes at least one of a first synchronous PWM control mode in which voltage commands for the respective winding groups of the multiplex-winding electric motor are subjected to the PWM control using a carrier synchronized with a voltage command for a specific winding group, and a second synchronous PWM control mode in which voltage commands for the respective winding groups of the multiplex-winding electric motor are subjected to the PWM control using respective carriers synchronized with the respective voltage commands, and the PWM controller performs control while selectively switching between the asynchronous PWM control mode, and both or one of the first synchronous PWM control mode and the second synchronous PWM control mode, on the basis of an operation state of the multiplex-winding electric motor.

2. The power converter control device according to claim 1, wherein
in the first synchronous PWM control mode, phase correction according to a phase difference between the voltage commands for the plurality of winding groups is performed for the carrier synchronized with the voltage command for the specific winding group of the multiplex-winding electric motor.

3. The power converter control device according to claim 1, wherein
in the first synchronous PWM control mode, phase correction according to an electric phase difference between the winding groups of the multiplex-winding electric motor is performed for the carrier synchronized with the voltage command for the specific winding group of the multiplex-winding electric motor.

4. The power converter control device according to claim 1, wherein
in the second synchronous PWM control mode, phase correction according to a phase difference between the voltage commands for the plurality of winding groups is performed for each of the carriers synchronized with the voltage commands for the respective winding groups of the multiplex-winding electric motor.

5. The power converter control device according to claim 1, wherein
the PWM controller selects the asynchronous PWM control mode in a region in which a frequency of the voltage commands for the plurality of winding groups of the multiplex-winding electric motor is lower than a predetermined frequency, and selects the first synchronous PWM control mode or the second synchronous PWM control mode in a region in which the frequency of the voltage commands for the plurality of winding groups is higher than the predetermined frequency.

6. The power converter control device according to claim 1, wherein
the PWM controller selects the asynchronous PWM control mode in a region in which a rotation speed of the multiplex-winding electric motor is lower than a predetermined speed, and selects the first synchronous PWM control mode or the second synchronous PWM control mode in a region in which the rotation speed is higher than the predetermined speed.

7. The power converter control device according to claim 1, wherein
the PWM controller selects the asynchronous PWM control mode in a region in which a modulation factor of the voltage commands for the plurality of winding groups of the multiplex-winding electric motor is lower than a predetermined value, and selects the first synchronous PWM control mode or the second synchronous PWM control mode in a region in which the modulation factor of the voltage commands for the plurality of winding groups is higher than the predetermined value.

8. The power converter control device according to claim 1, wherein
the PWM controller includes:
a carrier generator configured to output the carrier for performing the PWM control; and
a switching pulse generator configured to generate a switching pulse for driving a switching element of the power converter, using the carrier, and
the carrier generator outputs the carrier in accordance with each control mode based on the operation state of the multiplex-winding electric motor.

9. The power converter control device according to claim 1, wherein
in the asynchronous PWM control mode, the PWM control of the voltage commands for the respective winding groups of the multiplex-winding electric motor is respectively performed using a plurality of the carriers having a certain phase difference.

10. The power converter control device according to claim 2, wherein
the PWM controller selects the asynchronous PWM control mode in a region in which a frequency of the voltage commands for the plurality of winding groups of the multiplex-winding electric motor is lower than a predetermined frequency, and selects the first synchronous PWM control mode or the second synchronous PWM control mode in a region in which the frequency of the voltage commands for the plurality of winding groups is higher than the predetermined frequency.

11. The power converter control device according to claim 3, wherein
the PWM controller selects the asynchronous PWM control mode in a region in which a frequency of the voltage commands for the plurality of winding groups of the multiplex-winding electric motor is lower than a predetermined frequency, and selects the first synchronous PWM control mode or the second synchronous PWM control mode in a region in which the frequency of the voltage commands for the plurality of winding groups is higher than the predetermined frequency.

12. The power converter control device according to claim 4, wherein
the PWM controller selects the asynchronous PWM control mode in a region in which a frequency of the voltage commands for the plurality of winding groups of the multiplex-winding electric motor is lower than a predetermined frequency, and selects the first synchronous PWM control mode or the second synchronous PWM control mode in a region in which the frequency of the voltage commands for the plurality of winding groups is higher than the predetermined frequency.

13. The power converter control device according to claim 2, wherein
the PWM controller selects the asynchronous PWM control mode in a region in which a rotation speed of the multiplex-winding electric motor is lower than a predetermined speed, and selects the first synchronous PWM control mode or the second synchronous PWM control mode in a region in which the rotation speed is higher than the predetermined speed.

14. The power converter control device according to claim 3, wherein
the PWM controller selects the asynchronous PWM control mode in a region in which a rotation speed of the multiplex-winding electric motor is lower than a predetermined speed, and selects the first synchronous PWM control mode or the second synchronous PWM control mode in a region in which the rotation speed is higher than the predetermined speed.

15. The power converter control device according to claim 4, wherein
the PWM controller selects the asynchronous PWM control mode in a region in which a rotation speed of the multiplex-winding electric motor is lower than a predetermined speed, and selects the first synchronous PWM control mode or the second synchronous PWM control mode in a region in which the rotation speed is higher than the predetermined speed.

16. The power converter control device according to claim 2, wherein
the PWM controller selects the asynchronous PWM control mode in a region in which a modulation factor of the voltage commands for the plurality of winding groups of the multiplex-winding electric motor is lower than a predetermined value, and selects the first synchronous PWM control mode or the second synchronous PWM control mode in a region in which the modulation factor of the voltage commands for the plurality of winding groups is higher than the predetermined value.

17. The power converter control device according to claim 3, wherein
the PWM controller selects the asynchronous PWM control mode in a region in which a modulation factor of the voltage commands for the plurality of winding groups of the multiplex-winding electric motor is lower than a predetermined value, and selects the first synchronous PWM control mode or the second synchronous PWM control mode in a region in which the modulation factor of the voltage commands for the plurality of winding groups is higher than the predetermined value.

18. The power converter control device according to claim 4, wherein
the PWM controller selects the asynchronous PWM control mode in a region in which a modulation factor of the voltage commands for the plurality of winding groups of the multiplex-winding electric motor is lower than a predetermined value, and selects the first synchronous PWM control mode or the second synchronous PWM control mode in a region in which the modulation factor of the voltage commands for the plurality of winding groups is higher than the predetermined value.

\* \* \* \* \*